(12) United States Patent
Zhao et al.

(10) Patent No.: US 10,972,733 B2
(45) Date of Patent: Apr. 6, 2021

(54) LOOK-UP TABLE FOR ENHANCED MULTIPLE TRANSFORM

(71) Applicant: QUALCOMM Incorporated, San Diego, CA (US)

(72) Inventors: Xin Zhao, San Diego, CA (US); Vadim Seregin, San Diego, CA (US); Marta Karczewicz, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 15/649,612

(22) Filed: Jul. 13, 2017

(65) Prior Publication Data

US 2018/0020218 A1    Jan. 18, 2018

Related U.S. Application Data

(60) Provisional application No. 62/363,188, filed on Jul. 15, 2016.

(51) Int. Cl.
| | | |
|---|---|---|
| *H04N 19/159* | (2014.01) | |
| *H04N 19/593* | (2014.01) | |
| *H04N 19/124* | (2014.01) | |
| *H04N 19/61* | (2014.01) | |
| *H04N 19/176* | (2014.01) | |
| *H04N 19/12* | (2014.01) | |
| *H04N 19/103* | (2014.01) | |

(52) U.S. Cl.
CPC ......... *H04N 19/124* (2014.11); *H04N 19/103* (2014.11); *H04N 19/12* (2014.11); *H04N 19/176* (2014.11); *H04N 19/61* (2014.11)

(58) Field of Classification Search
CPC .... H04N 19/124; H04N 19/103; H04N 19/12; H04N 19/176; H04N 19/61; H04N 19/105; H04N 19/159; H04N 19/593; H04N 19/32
See application file for complete search history.

(56) References Cited

U.S. PATENT DOCUMENTS

| | | | |
|---|---|---|---|
| 2012/0057630 A1* | 3/2012 | Saxena | H04N 19/105 375/240.03 |
| 2017/0272748 A1* | 9/2017 | Seregin | H04N 19/593 |
| 2018/0262777 A1* | 9/2018 | Filippov | H04N 19/122 |

OTHER PUBLICATIONS

ITU-T H261, Line Transmission of Non-Telephone Signals, Video Codec for Audiovisual Services At p x 64 kbits, The International Telecommunication Union, Mar. 1993, 29 pp.

(Continued)

*Primary Examiner* — Patrick E Demosky
(74) *Attorney, Agent, or Firm* — Shumaker & Sieffert, P.A.

(57) ABSTRACT

Example techniques are described to illustrate multiple transform applied for Intra prediction residual. It may be used in the context of advanced video codecs, such as extensions of HEVC or the next generation of video coding standards. A video encoder and a video decoder may select transform subsets that each identify one or more candidate transforms. The video encoder and the video decoder may determine transforms from the selected transform subsets.

21 Claims, 12 Drawing Sheets

(56) References Cited

OTHER PUBLICATIONS

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang et al., "High Efficiency Video Coding (HEVC) Defect Report", Joint Collaborative Team on Video Coding (JCT-VC) of ITU-T SG 16 WP3 and ISO/IEC JTC1/SC29/WG 11, 14th Meeting: Vienna, AT, Jul. 25-Aug. 2, 2013, JCTVC-N1003-v1, 311 pp.
Lorcy et al., "Proposed improvements to the Adaptive Multiple Core transform", Joint Video Exploration Team of ITU-T SG16 WP3 and ISO/IEC JTC1/SC29/WG11, 3rd Meeting: Geneva, CH, May 26-Jun. 1, 2016, JVET-00022, May 15, 2016, 4 pp.
Zhao et al., "Enhanced Multiple Transform for Video Coding," Data Compression Conference, Qualcomm Technologies Inc, Mar. 30, 2016, 10 pp.
Martucci et al., "Symmetric convolution and the discrete sine and cosine transforms," IEEE Transactions on Signal Processing, vol. 42, No. 5, May 1, 1994, IEEE Signal Processing Society, 14 pp.
Han et al., "Towards jointly optimal spatial prediction and adaptive transform in video/image coding," IEEE International Conference on Acoustics, Speech and Signal Processing (ICASSP), Mar. 2010, 4 pp.
Jain, "A sinusoidal family of unitary transforms", IEEE Transactions on Pattern Analysis and Machine Intelligence, Oct. 1, 1979, IEEE Service Center, 10 pp.
Lim et al., "Rate distortion optimized adaptive transform coding," Optical Engineering, vol. 48, No. 8, pp. 087004-1-387004-14, Aug. 2009, 14 pp.
Ye et al., "Improved H.264 intra coding based on bidirectional intra prediction, directional transform, and adaptive coefficient scanning," in Proc. 15th IEEE Int. Conf. Image Process., Oct. 2008, 4 pp.
Zhao et al. "Video coding with rate distortion optimized transform," IEEE Transactions on Circuits and Systems for Video Technology, vol. 22, No. 1, Jan. 2012, 14 pp.
Saxena et al., "DCT/DST-Based Transform Coding for Intra Prediction in Image/Video Coding," IEEE Transactions on Image Processing, vol. 22, No. 10, Oct. 2013, 8 pp.
Yeo et al., "Mode-Dependent Transforms for Coding Directional Intra Prediction Residuals," IEEE Transactions on Circuits and Systems for Video Technology, vol. 22, No. 4, Apr. 2012, 10 pp.
Zou et al., "Rate-Distortion Optimized Transforms Based on the Lloyd-Type Algorithm for Intra Block Coding ," IEEE Journal of Selected Topics in Signal Processing, vol. 7, Issue: 6, Dec. 2013, 12 pp.
An et al., "Non-CE7: Boundary-Dependent Transform for Inter-Predicted Residue," Joint Collaborative Team on Video Coding (JCT-VC) of ITU-T SG16 SP3 and ISO/IEC JTC1/SC29/WG11, 7th Meeting: Geneva, CH, Nov. 21-30, 2011, JCTVC-G281, Nov. 16, 2011, 11 pp.
Partial International Search Report of International Application No. PCT/US2017/042181, dated Oct. 5, 2017, 22 pp.
Philippe, et al., "EE2: Adaptive Primary Transform Improvement", Joint Video Exploration Team (JVET) of ITU-T SG 16 WP 3 and ISO/IEC JTC 1/SC 29/WG 11, 4th Meeting, JVET-O0065, Oct. 5, 2016, JVET-D0065, 7 pp.
Chen, et al., "Algorithm description of Joint Exploration Test Model 2", JVET Meeting; Feb. 20-26, 2016; 2nd Meeting: San Diego; The Joint Video Exploration Team of ISO/IEC JTC1/SC29/WG11 and ITU-T SG.16; No. JVET-B1001-v1, Mar. 8, 2016, XP030150091, 31 pp.
Lorcy, et al., "EE2: Adaptive Primary Transform Improvement", JVET Meeting; Oct. 15-21, 2016; 4th Meeting: Chengdu, CN; The Joint Video Exploration Team (JVET) OF ITU-T SG 16 WP 3 and ISO/IEC JTC 1/SC 29/WG 11; No. JVET-D0065, Oct. 5, 2016, 7 pp.
Kanumuri et al., "Enhancements to Intra Coding" Joint Collaborative Team on Video Coding (JCT-VC) of ITU-T 3G16 WP3 and ISO/IEC JTC1/SC29/WG11, Jan. 20-28, 2011, JCT-VC D0235, 4th Meeting: Daegu, KR, Jan. 14, 2011, 7 pp.
Britanak V., et al., "Discrete Cosine and Sine Transforms", General Properties, Fast Algorithms and Integer Approximations, Academic Press, Apr. 2007, pp. 16-38, 25 pp.
International Search Report and Written Opinion, Application No. PCT/US2017/042181—ISA/EPO—dated Nov. 30, 2017, 24 pages.
Anonymous: "Content of srccode.zip of JVET-O0022-v4.zip," May 19, 2016, XP055482606, [retrieved on Jun. 8, 2018], 1 pp.
Anonymous: "JVET-O0022 web page in JVET repository," May 19, 2016, XP055482600, 4 pages, [retrieved on Jun. 8, 2018].
Anonymous: "Source Code TComRom.cpp of JVET-O0022-v4.zip," May 19, 2016, pp. 1-77, XP055482573, Retrieved from the Internet: URL: http://phenix.it-sudparis.eu/jvet/ [retrieved on Jun. 8, 2018].
International Preliminary Report on Patentability from International Application No. PCT/US2017/042181, dated Dec. 11, 2018, 25 pp.
Second Written Opinion from International Application No. PCT/US2017/042181, dated Sep. 20, 2018, 9 pp.
Response to Written Opinion dated Nov. 30, 2017, from International Application No. PCT/US2017/042181, filed on May 15, 2018, 5 pp.

* cited by examiner

4x4 DST-VII:

4-point DCT-II:

8-point DCT-II:

16-point DCT-II:

{64, 64, 64, 64, 64, 64, 64, 64, 64, 64, 64, 64, 64, 64, 64, 64}
{90, 87, 80, 70, 57, 43, 25, 9, -9,-25,-43,-57,-70,-80,-87,-90}
{89, 75, 50, 18,-18,-50,-75,-89,-89,-75,-50,-18, 18, 50, 75, 89}
{87, 57, 9,-43,-80,-90,-70,-25, 25, 70, 90, 80, 43, -9,-57,-87}
{83, 36,-36,-83,-83,-36, 36, 83, 83, 36,-36,-83,-83,-36, 36, 83}
{80, 9,-70,-87,-25, 57, 90, 43,-43,-90,-57, 25, 87, 70, -9,-80}
{75,-18,-89,-50, 50, 89, 18,-75,-75, 18, 89, 50,-50,-89,-18, 75}
{70,-43,-87, 9, 90, 25,-80,-57, 57, 80,-25,-90, -9, 87, 43,-70}
{64,-64,-64, 64, 64,-64,-64, 64, 64,-64,-64, 64, 64,-64,-64, 64}
{57,-80,-25, 90, -9,-87, 43, 70,-70,-43, 87, 9,-90, 25, 80,-57}
{50,-89, 18, 75,-75,-18, 89,-50,-50, 89,-18,-75, 75, 18,-89, 50}
{43,-90, 57, 25,-87, 70, 9,-80, 80, -9,-70, 87,-25,-57, 90,-43}
{36,-83, 83,-36,-36, 83,-83, 36, 36,-83, 83,-36,-36, 83,-83, 36}
{25,-70, 90,-80, 43, 9,-57, 87,-87, 57, -9,-43, 80,-90, 70,-25}
{18,-50, 75,-89, 89,-75, 50,-18,-18, 50,-75, 89,-89, 75,-50, 18}
{9, -25, 43,-57, 70,-80, 87,-90, 90,-87, 80,-70, 57,-43, 25, -9}

FIG. 1D 32-point DCT-II:

{64,64,64,64,64,64,64,64,64,64,64,64,64,64,64,64,64,64,64,64,64,64,64,64,64,64,64,64,64,64,64,64}
{90,90,88,85,82,78,73,67,61,54,46,38,31,22,13,4,-4,-13,-22,-31,-38,-46,-54,-61,-67,-73,-78,-82,-85,-88,-90,-90}
{90,87,80,70,57,43,25,9,-9,-25,-43,-57,-70,-80,-87,-90,-90,-87,-80,-70,-57,-43,-25,-9,9,25,43,57,70,80,87,90}
{90,82,67,46,22,-4,-31,-54,-73,-85,-90,-88,-78,-61,-38,-13,13,38,61,78,88,90,85,73,54,31,4,-22,-46,-67,-82,-90}
{89,75,50,18,-18,-50,-75,-89,-89,-75,-50,-18,18,50,75,89,89,75,50,18,-18,-50,-75,-89,-89,-75,-50,-18,18,50,75,89}
{88,67,31,-13,-54,-82,-90,-78,-46,-4,38,73,90,85,61,22,-22,-61,-85,-90,-73,-38,4,46,78,90,82,54,13,-31,-67,-88}
{87,57,9,-43,-80,-90,-70,-25,25,70,90,80,43,-9,-57,-87,-87,-57,-9,43,80,90,70,25,-25,-70,-90,-80,-43,9,57,87}
{85,46,-13,-67,-90,-73,-22,38,82,88,54,-4,-61,-90,-78,-31,31,78,90,61,4,-54,-88,-82,-38,22,73,90,67,13,-46,-85}
{83,36,-36,-83,-83,-36,36,83,83,36,-36,-83,-83,-36,36,83,83,36,-36,-83,-83,-36,36,83,83,36,-36,-83,-83,-36,36,83}
{82,22,-54,-90,-61,13,78,85,31,-46,-90,-67,4,73,88,38,-38,-88,-73,-4,67,90,46,-31,-85,-78,-13,61,90,54,-22,-82}
{80,9,-70,-87,-25,57,90,43,-43,-90,-57,25,87,70,-9,-80,-80,-9,70,87,25,-57,-90,-43,43,90,57,-25,-87,-70,9,80}
{78,-4,-82,-73,13,85,67,-22,-88,-61,31,90,54,-38,-90,-46,46,90,38,-54,-90,-31,61,88,22,-67,-85,-13,73,82,4,-78}
{75,-18,-89,-50,50,89,18,-75,-75,18,89,50,-50,-89,-18,75,75,-18,-89,-50,50,89,18,-75,-75,18,89,50,-50,-89,-18,75}
{73,-31,-90,-22,78,67,-38,-90,-13,82,61,-46,-88,-4,85,54,-54,-85,4,88,46,-61,-82,13,90,38,-67,-78,22,90,31,-73}
{70,-43,-87,9,90,25,-80,-57,57,80,-25,-90,-9,87,43,-70,-70,43,87,-9,-90,-25,80,57,-57,-80,25,90,9,-87,-43,70}
{67,-54,-78,38,85,-22,-90,4,90,13,-88,-31,82,46,-73,-61,61,73,-46,-82,31,88,-13,-90,-4,90,22,-85,-38,78,54,-67}
{64,-64,-64,64,64,-64,-64,64,64,-64,-64,64,64,-64,-64,64,64,-64,-64,64,64,-64,-64,64,64,-64,-64,64,64,-64,-64,64}
{61,-73,-46,82,31,-88,-13,90,-4,-90,22,85,-38,-78,54,67,-67,-54,78,38,-85,-22,90,4,-90,13,88,-31,-82,46,73,-61}
{57,-80,-25,90,-9,-87,38,67,-73,-38,87,9,-90,25,80,-57,-57,80,25,-90,9,87,-38,-67,73,38,-87,-9,90,-25,-80,57}
{54,-85,-4,88,-46,-61,82,13,-90,38,67,-78,-22,90,-31,-73,73,31,-90,22,78,-67,-38,90,-13,-82,61,46,-88,4,85,-54}
{50,-89,18,75,-75,-18,89,-50,-50,89,-18,-75,75,18,-89,50,50,-89,18,75,-75,-18,89,-50,-50,89,-18,-75,75,18,-89,50}
{46,-90,38,54,-90,31,61,-88,22,67,-85,13,73,-82,4,78,-78,-4,82,-73,-13,85,-67,-22,88,-61,-31,90,-54,-38,90,-46}
{43,-90,57,25,-87,70,9,-80,87,-43,-25,25...

Note: portions of this matrix image are difficult to transcribe with full accuracy.

```
Int g_aiTrSet[4][67][4][2] =
{
  {{DST7, DST7}, {DST4, DST4}, {DST4, DST7}, {DCT5, DCT5}, {DCT5, DCT8}, {DCT8, DCT5}, {DCT5, DCT8}, {DST1, DCT8}},
  {{DCT5, DST5}, {DST8, DCT8}, {DST4, DST4}, {DCT5, DCT5}, {DST7, DST7}, {DST7, DST4}, {DCT8, DCT5}, {DCT8, DCT8}},
  {{DST7, DST7}, {DCT8, DCT8}, {DCT8, DST4}, {DCT5, DST4}, {DST7, DST7}, {DCT8, DST4}, {DCT8, DST4}, {DST4, DCT4}},
  {{DCT5, DST5}, {DST4, DCT4}, {DST4, DST4}, {DCT5, DCT2}, {DCT5, DCT5}, {DST1, DCT5}, {ID  , DST1}, {DCT8, DCT2}},
  {{DST7, DST7}, {DST1, DST1}, {DCT2, DST4}, {DCT5, DCT5}, {DST7, DST7}, {DCT5, DCT5}, {ID  , DCT8}, {ID  , DST4}},
  {{DCT5, DCT5}, {DCT8, DCT5}, {DCT5, DCT2}, {DST7, DST7}, {DCT5, DCT5}, {DST7, DCT2}, {ID  , DST7}, {DST1, DCT2}},
  {{DST4, DCT5}, {ID  , DST4}, {DST7, DST7}, {DCT5, DCT5}, {DCT5, DST7}, {DST7, DCT5}, {ID  , DCT5}, {DCT5, DST7}},
  {{DST4, DCT5}, {ID  , ID  }, {DCT2, DST7}, {DCT5, DCT5}, {DCT5, DST7}, {DST7, DCT5}, {ID  , DCT5}, {DCT5, DST7}},
  {{DCT5, DCT5}, {DCT8, DST7}, {DCT2, DST7}, {DST7, DST7}, {DCT5, DCT5}, {DST7, DST7}, {ID  , DST7}, {DST1, DCT5}},
  {{DCT5, DST7}, {ID  , DCT5}, {DST7, DST7}, {DCT5, DCT5}, {DCT5, DST7}, {DST7, DCT5}, {DCT8, DCT8}, {DCT8, DCT8}},
  {{DCT5, DST7}, {DST7, DST7}, {DCT5, DST7}, {DCT5, DST7}, {DST4, DCT5}, {DCT5, DST7}, {DCT8, DST1}, {DST4, DCT4}},
  {{DCT5, DCT5}, {DCT8, DCT8}, {DCT8, DST7}, {DCT5, DCT5}, {DCT5, DCT5}, {DCT8, DST4}, {DST1, DST4}, {DCT8, DCT8}},
  {{DCT5, DCT5}, {DST4, DST4}, {DST4, DST4}, {DST4, DCT5}, {DCT5, DST7}, {DST4, DCT8}, {DST1, DCT8}, {DCT8, DCT8}},
  {{DCT5, DST7}, {DST7, DST7}, {DCT8, DST4}, {DST4, DCT5}, {DCT5, DST7}, {DCT8, DST4}, {DST4, DST4}, {DST4, DST4}},
  {{DCT5, DST7}, {DCT8, DCT8}, {DCT8, DCT5}, {DCT5, DCT5}, {DCT5, DST7}, {DCT8, DCT8}, {DST4, DCT8}, {DCT8, DCT2}},
  {{DST4, DST7}, {DST1, DST1}, {DST7, DST7}, {DCT5, DCT5}, {DST4, DST4}, {DCT8, DST1}, {DST7, DCT5}, {DST7, DCT2}},
  {{DST4, DST4}, {DCT8, DCT8}, {DCT8, DST4}, {DCT5, DCT5}, {DST4, DST4}, {DCT8, DST4}, {DST7, DST7}, {DCT2, DST7}},
  {{DCT5, DST7}, {DST7, DST7}, {DCT5, DST7}, {DST7, DCT5}, {DCT5, DCT5}, {DST7, DST7}, {DST7, ID  }, {DST7, DCT8}},
  {{DCT5, DCT5}, {ID  , DST7}, {ID  , DCT8}, {DCT5, DST7}, {DCT5, DST4}, {ID  , ID  }, {ID  , DST7}, {ID  , ID  }},
  {{DCT5, DST7}, {ID  , DST7}, {DCT2, DST1}, {DCT5, DST7}, {DCT5, DST4}, {ID  , DST7}, {DST7, DST1}, {DST7, DST4}},
  {{DCT5, DST7}, {DCT2, DCT2}, {DCT2, DST1}, {DST7, DCT5}, {DCT5, DST4}, {DCT2, DCT2}, {DST1, DST7}, {DCT8, DCT8}},
  {{DCT5, DST4}, {DCT2, DST7}, {DCT2, DCT2}, {DST7, DCT5}, {DCT5, DCT5}, {DCT2, DCT2}, {DST7, DCT2}, {DST7, DCT2}},
  {{DCT5, DST4}, {DST7, DST7}, {DCT2, DST7}, {DST7, DCT5}, {DCT5, DCT5}, {DCT2, DST1}, {DCT2, DCT2}, {DCT2, DCT2}},
  {{DCT5, DST7}, {DST7, DST7}, {DST1, DST1}, {DCT5, DCT5}, {DST7, DST7}, {DST1, DCT8}, {DCT5, DST4}, {DST7, DCT5}},
  {{DCT5, DCT5}, {DST4, DST4}, {ID  , DST4}, {DCT5, DST4}, {DST7, DST7}, {DST4, DCT8}, {DST4, DST4}, {DST4, DCT5}},
  {{DCT5, DCT5}, {DST4, DST4}, {DCT8, DCT8}, {DST7, DCT5}, {DST4, DST4}, {DCT8, DST1}, {DST4, DST4}, {DCT2, DCT2}},
  {{DST7, DCT5}, {DST7, DST7}, {DST7, DST7}, {DST7, DST7}, {DST4, DST4}, {DST7, DST7}, {DCT2, DST7}, {DCT2, DST7}},
  {{DCT5, DCT5}, {DST7, DST7}, {DCT8, DCT8}, {DCT5, DCT5}, {DST4, DCT5}, {DCT8, ID  }, {DST7, ID  }, {DCT2, ID  }},
  {{DCT5, DST7}, {DST7, DST7}, {ID  , ID  }, {DCT5, DCT5}, {DST4, DST4}, {ID  , ID  }, {DCT5, DST7}, {DST4, DCT8}},
  {{DST7, DCT5}, {ID  , ID  }, {DCT8, DCT8}, {DST7, DST7}, {DST4, DCT5}, {DCT8, DCT5}, {ID  , DST7}, {ID  , DCT8}},
  {{DST7, DCT5}, {DCT2, DCT2}, {DST1, DST1}, {DST7, DST7}, {DCT5, DST4}, {DST1, ID  }, {DCT8, DST7}, {DST7, DCT5}},
  {{DST7, DCT5}, {DCT2, DCT2}, {ID  , ID  }, {DST7, DST7}, {DCT5, DST4}, {ID  , DCT2}, {ID  , DST1}, {ID  , DST1}},
  {{DST7, DCT5}, {DST7, DST7}, {DCT8, DCT8}, {DST7, DST7}, {DCT5, DCT2}, {DCT8, DCT2}, {DCT2, DST1}, {DCT2, DCT2}},
  {{DST7, DST7}, {DST7, DST7}, {DCT2, DCT2}, {DCT5, DCT5}, {DCT5, DST7}, {DCT2, DCT5}, {DCT5, DST1}, {DCT2, DST7}},
  {{DST5, DCT5}, {DST4, DST4}, {DCT2, DCT2}, {DCT5, DST7}, {DCT5, DST4}, {DCT2, DCT5}, {DCT5, DST7}, {DCT2, DCT2}},
  {{DST5, DST7}, {DST4, DST4}, {DCT8, DCT8}, {DCT5, DST7}, {DST4, DCT5}, {DCT8, DCT2}, {DST7, DST7}, {DCT2, DST7}},
  {{DCT5, DCT5}, {DST7, DST7}, {DST1, DST1}, {DST7, DST7}, {DST4, DST4}, {DST1, DCT2}, {DST7, DCT5}, {DST7, DCT5}},
  {{DCT5, DCT5}, {DST7, DST7}, {ID  , ID  }, {DCT5, DCT5}, {DST4, DST4}, {ID  , DCT5}, {DST7, DST7}, {DST7, DCT5}},
  {{DCT5, DST7}, {DST7, DST7}, {DCT8, DCT8}, {DCT5, DCT5}, {DST4, DCT5}, {DCT8, DST7}, {DST7, DST7}, {DST7, DST7}},
  {{DCT5, DST7}, {ID  , ID  }, {DCT2, DST7}, {DCT5, DCT5}, {DST4, DCT5}, {DCT2, DST7}, {DCT5, DCT5}, {DCT8, DCT8}},
  {{DCT5, DST4}, {DST1, DST1}, {DST7, DST7}, {DST7, DCT5}, {DCT5, DCT5}, {DST7, DST7}, {DCT5, DST7}, {DST1, DCT5}},
  {{DCT5, DST4}, {DST7, DST7}, {ID  , ID  }, {DST7, DCT5}, {DCT5, DST4}, {ID  , DST7}, {DST7, DST7}, {DST7, DCT5}},
  {{DCT5, DCT5}, {DST7, DST7}, {DCT2, DCT2}, {DST7, DCT5}, {DCT5, DCT5}, {DCT2, DST4}, {DCT2, DST7}, {DST7, DST4}},
  {{DCT5, DCT5}, {DST4, DST4}, {DCT8, DCT8}, {DST7, DCT5}, {DCT5, DST7}, {DCT8, DST7}, {DST4, DST4}, {DST7, DCT5}},
  {{DST5, DST4}, {DST4, DST4}, {ID  , ID  }, {DCT5, DCT5}, {DST4, DST4}, {ID  , DCT5}, {DST4, DST4}, {DST4, DCT5}},
  {{DST5, DCT5}, {DCT8, DCT8}, {DCT8, DCT8}, {DST7, DCT5}, {DCT5, DST7}, {DCT8, DST4}, {DST7, DCT5}, {DST7, DST1}},
  {{DCT5, DST4}, {ID  , ID  }, {ID  , ID  }, {DCT5, DCT5}, {DCT5, DCT5}, {ID  , DST4}, {DST4, ID  }, {DST1, DCT5}},
  {{DCT5, DST4}, {DST7, DST7}, {ID  , ID  }, {DCT5, DST7}, {DCT5, DST7}, {ID  , DCT5}, {DST7, DST1}, {DST7, DCT8}},
  {{DCT5, DST7}, {DST7, DST7}, {DCT2, DCT2}, {DCT5, DCT5}, {DCT5, DCT5}, {DCT2, DCT2}, {DST1, DST4}, {DCT2, DCT5}},
  {{DCT5, DST7}, {DST4, DST4}, {DCT8, DCT8}, {DCT5, DCT5}, {DCT5, DCT5}, {DCT8, DCT2}, {DST7, DST4}, {DCT2, DST4}},
  {{DCT5, DST4}, {DST1, DST1}, {DST1, DST1}, {DCT5, DCT5}, {DCT5, DCT5}, {DST1, DCT2}, {DST7, DCT8}, {DST4, DCT5}},
  {{DCT5, DCT5}, {DST7, DST7}, {ID  , ID  }, {DCT5, DCT5}, {DCT5, DST7}, {ID  , DCT2}, {DST1, DST4}, {DST4, DCT5}},
  {{DST5, DCT5}, {DCT8, DCT8}, {DCT8, DCT8}, {DCT5, DCT5}, {DCT5, DST4}, {DCT8, DST4}, {DST7, DCT8}, {DCT8, DST5}},
  {{DCT5, DCT5}, {ID  , ID  }, {ID  , ID  }, {DCT5, DCT5}, {DST7, DST4}, {ID  , DCT8}, {ID  , DCT8}, {DST7, DST5}},
  {{DCT5, DCT5}, {DST4, DST4}, {DCT2, DCT2}, {DCT5, DCT5}, {DST7, DST4}, {DCT2, DCT8}, {DST7, DST4}, {DST1, DST5}},
  {{DCT5, DST7}, {DST4, DST4}, {DCT8, DCT8}, {DST7, DCT5}, {DST7, DCT5}, {DCT8, DCT5}, {ID  , DST7}, {ID  , DST7}},
  {{DCT5, DCT5}, {DST7, DST7}, {DST7, DST7}, {DCT5, DCT5}, {DST7, DCT5}, {DST7, DCT8}, {DCT8, DST1}, {DST7, DCT2}},
  {{DCT5, DCT5}, {DST4, DST4}, {DCT8, DCT8}, {DST7, DST7}, {DST7, DCT5}, {DCT8, DST7}, {DST1, DCT5}, {DST1, DCT8}},
  {{DCT5, DCT5}, {DST4, DST4}, {ID  , ID  }, {DST7, DST7}, {DST7, DCT5}, {ID  , DCT5}, {DCT2, ID  }, {DCT5, DCT8}},
  {{DCT5, DST7}, {DST7, DST7}, {DCT2, DCT2}, {DST7, DST7}, {DST7, DCT2}, {DCT2, DCT8}, {DST7, ID  }, {DCT8, DST4}},
  {{DST5, DCT5}, {DCT2, DCT2}, {DCT2, DCT2}, {DST7, DCT5}, {DST7, DCT2}, {DCT2, DCT5}, {DCT5, ID  }, {DST7, DCT5}},
  {{DST5, DCT5}, {DCT2, DCT2}, {DST1, DST1}, {DST7, DST7}, {DST7, DCT2}, {DST1, DCT5}, {DCT5, DCT5}, {DCT2, DST4}},
  {{DCT5, DCT5}, {DST1, DST1}, {DCT2, DCT2}, {DST7, DCT5}, {DST4, DCT5}, {DCT2, DST4}, {DST4, DCT5}, {DCT2, DST4}},
  {{DCT5, DST7}, {DST7, DST7}, {DST7, DST7}, {DST7, DST7}, {DST7, DST4}, {DST7, DST4}, {DCT2, DCT5}, {DST7, DCT8}},
  {{DCT5, DST7}, {DST4, DST4}, {DST4, DST4}, {DCT5, DCT5}, {DST7, DCT5}, {DST4, DST4}, {DCT2, DCT2}, {DST4, DST4}},
  {{DST5, DST4}, {DST4, DST4}, {DCT8, DCT8}, {DCT5, DCT5}, {DST7, DCT5}, {DCT8, DCT2}, {DST4, DST4}, {DCT2, DST4}},
  {{DCT5, DCT5}, {DST4, DST4}, {DCT8, DCT8}, {DST7, DST7}, {DST7, DCT5}, {DCT8, DST1}, {DST4, DST4}, {DST4, DST1}},
},
```

```
transformSetIdxLut[5][3][35] =
{
  //  0  1  2  3  4  5  6  7  8  9 10 11 12 13 14 15 16 17 18 19 20 21 22 23 24 25 26 27 28 29 30 31 32 33 34
  {  0, 4, 5, 5, 5, 5, 5, 5, 5, 5, 5, 5, 5, 5, 5, 5, 5, 5, 5, 5, 5, 5, 5, 5, 5, 5, 5, 5, 5, 5, 5, 5, 5, 5, 5 },
  {  1, 4, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6 },
  {  1, 4, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7 },
},
{
  {  2, 4, 8, 8, 8, 8, 8, 8, 8, 7, 7, 7, 7, 7, 7, 7, 7, 7, 7, 7, 7, 8, 8, 8, 8, 8, 8, 8, 8, 8, 8, 8, 8, 8, 8 },
  {  3, 4, 8, 8, 8, 8, 8, 8, 8, 7, 7, 7, 7, 7, 7, 7, 7, 7, 7, 7, 7, 8, 8, 8, 8, 8, 8, 8, 8, 8, 8, 8, 8, 8, 8 },
  {  3, 4, 8, 8, 8, 8, 8, 8, 8, 7, 7, 7, 7, 7, 7, 7, 7, 7, 7, 7, 7, 8, 8, 8, 8, 8, 8, 8, 8, 8, 8, 8, 8, 8, 8 },
},
{
  {  2, 4, 8, 8, 8, 8, 8, 8, 8, 8, 8, 8, 8, 8, 8, 8, 8, 8, 8, 8, 8, 8, 8, 8, 8, 8, 8, 8, 8, 8, 8, 8, 8, 8, 8 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
},
{
  {  2, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
},
{
  {  2, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
  {  3, 4, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9 },
};
```

FIG. 6

LOOK-UP TABLE FOR ENHANCED MULTIPLE TRANSFORM

This application claims the benefit of U.S. Provisional Application No. 62/363,188, filed Jul. 15, 2016, the entire content of which is incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques for determining transforms to use for generating a coefficient block from a transform block as part of video encoding and transforms to use for generating a transform block from a coefficient block as part of video decoding. In some examples, a video encoder may determine a plurality of transform subsets. Likewise, a video decoder may determine a plurality of transform subsets. The video encoder and the video decoder may select a transform subset for the plurality of transform subsets using implicit techniques that do not necessarily require additional signaling and determine transforms from the selected transform subsets. In this way, the video encoder and the video decoder may select from a relatively large set of transforms with a minimal increase in the amount of information that needs to be signaled.

In one example, this disclosure describes a method of decoding video data. The method comprising: for a current coefficient block of a video block encoded according to one of a plurality of prediction modes, selecting a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; selecting a horizontal and vertical transform pair combination from the selected set of horizontal and vertical transform pair combinations; selecting a horizontal transform and a vertical transform from the selected horizontal and vertical transform pair combination; applying an inverse transform using the selected horizontal transform and the selected vertical transform to the current coefficient block to determine a current transform block; and reconstructing the video block based on the current transform block and a predictive block.

In another example, this disclosure describes a device for decoding video data. The device comprising: a memory configured to store the video data; and one or more processors configured to: for a current coefficient block of a video block of the video data encoded according to one of a plurality of prediction modes, select a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; select a horizontal and vertical transform pair combination from the selected set of horizontal and vertical transform pair combinations; select a horizontal transform and a vertical transform from the selected horizontal and vertical transform pair combination; apply an inverse transform using the selected horizontal transform and the selected vertical transform to the current coefficient block to determine a current transform block; and reconstruct the video block based on the current transform block and a predictive block.

In another example, this disclosure describes a device for decoding a block of video data, comprising: means for selecting a set of horizontal and vertical transform pair combinations from all available sets of horizontal and vertical transform pair combinations for a selected set of transforms for a current coefficient block of the video block of video data encoded according to one of a plurality of prediction modes, wherein the selected set of horizontal and vertical transform pair combinations comprises one or more horizontal and vertical transform pair combinations; means for selecting a horizontal and vertical transform pair combination from the selected set of horizontal and vertical transform pair combinations; means for selecting a horizontal transform and a vertical transform from the selected horizontal and vertical transform pair combination; means for applying an inverse transform using the selected horizontal transform and the selected vertical transform to the current coefficient block to determine a current transform block; and means for reconstructing the video block based on the current transform block and a predictive block.

In another example, this disclosure describes a computer readable medium that stores instructions that, when executed by one or more processors cause the one or more processors to: for a current coefficient block of a video block encoded according to one of a plurality of prediction modes, select a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; select a horizontal and vertical transform pair combination from the selected set of horizontal and vertical transform pair combinations; select a horizontal transform and a vertical transform from the selected horizontal and vertical transform pair combination; apply an inverse transform using the selected horizontal transform and the selected vertical transform to the current coefficient block to determine a current transform block; and reconstruct the video block based on the current transform block and a predictive block.

In another example, this disclosure describes a method of encoding video data. The method comprising: for a current coefficient block of a video block encoded according to one of a plurality of prediction modes, selecting a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; selecting a horizontal and vertical transform pair combination from the selected set of horizontal and vertical transform pair combinations; selecting a horizontal transform and a vertical transform from the selected horizontal and vertical transform pair combination; applying a forward transform using the selected horizontal transform and the selected vertical transform to the current coefficient block to determine a current transform block; and reconstructing the video block based on the current transform block and a predictive block.

In another example, this disclosure describes a device for encoding video data. The device comprising: a memory configured to store the video data; and one or more processors configured to: for a current coefficient block of a video block of the video data encoded according to one of a plurality of prediction modes, select a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; select a horizontal and vertical transform pair combination from the selected set of horizontal and vertical transform pair combinations; select a horizontal transform and a vertical transform from the selected horizontal and vertical transform pair combination; apply a forward transform using the selected horizontal transform and the selected vertical transform to the current coefficient block to determine a current transform block; and reconstruct the video block based on the current transform block and a predictive block.

In another example, this disclosure describes a device for encoding a block of video data, comprising: means for selecting a set of horizontal and vertical transform pair combinations from all available sets of horizontal and vertical transform pair combinations for a selected set of transforms for a current coefficient block of the video block of video data encoded according to one of a plurality of prediction modes, wherein the selected set of horizontal and vertical transform pair combinations comprises one or more horizontal and vertical transform pair combinations; means for selecting a horizontal and vertical transform pair combination from the selected set of horizontal and vertical transform pair combinations; means for selecting a horizontal transform and a vertical transform from the selected horizontal and vertical transform pair combination; means for applying a forward transform using the selected horizontal transform and the selected vertical transform to the current coefficient block to determine a current transform block; and means for reconstructing the video block based on the current transform block and a predictive block.

In another example, this disclosure describes a computer readable medium that stores instructions that, when executed by one or more processors cause the one or more processors to: for a current coefficient block of a video block encoded according to one of a plurality of prediction modes, select a set of horizontal and vertical transform pair combinations from all available sets of horizontal and vertical transform pair combinations for a selected set of transforms, wherein the selected set of horizontal and vertical transform pair combinations comprises one or more horizontal and vertical transform pair combinations; select a horizontal and vertical transform pair combination from the selected set of horizontal and vertical transform pair combinations; select a horizontal transform and a vertical transform from the selected horizontal and vertical transform pair combination; apply a forward transform using the selected horizontal transform and the selected vertical transform to the current coefficient block to determine a current transform block; and reconstruct the video block based on the current transform block and a predictive block.

The details of one or more examples are set forth in the accompanying drawings and the description below. Other features, objects, and advantages will be apparent from the description and drawings, and from the claims.

BRIEF DESCRIPTION OF DRAWINGS

FIGS. 1A-1E are tables illustrating examples of transform types.

Figure 5B:
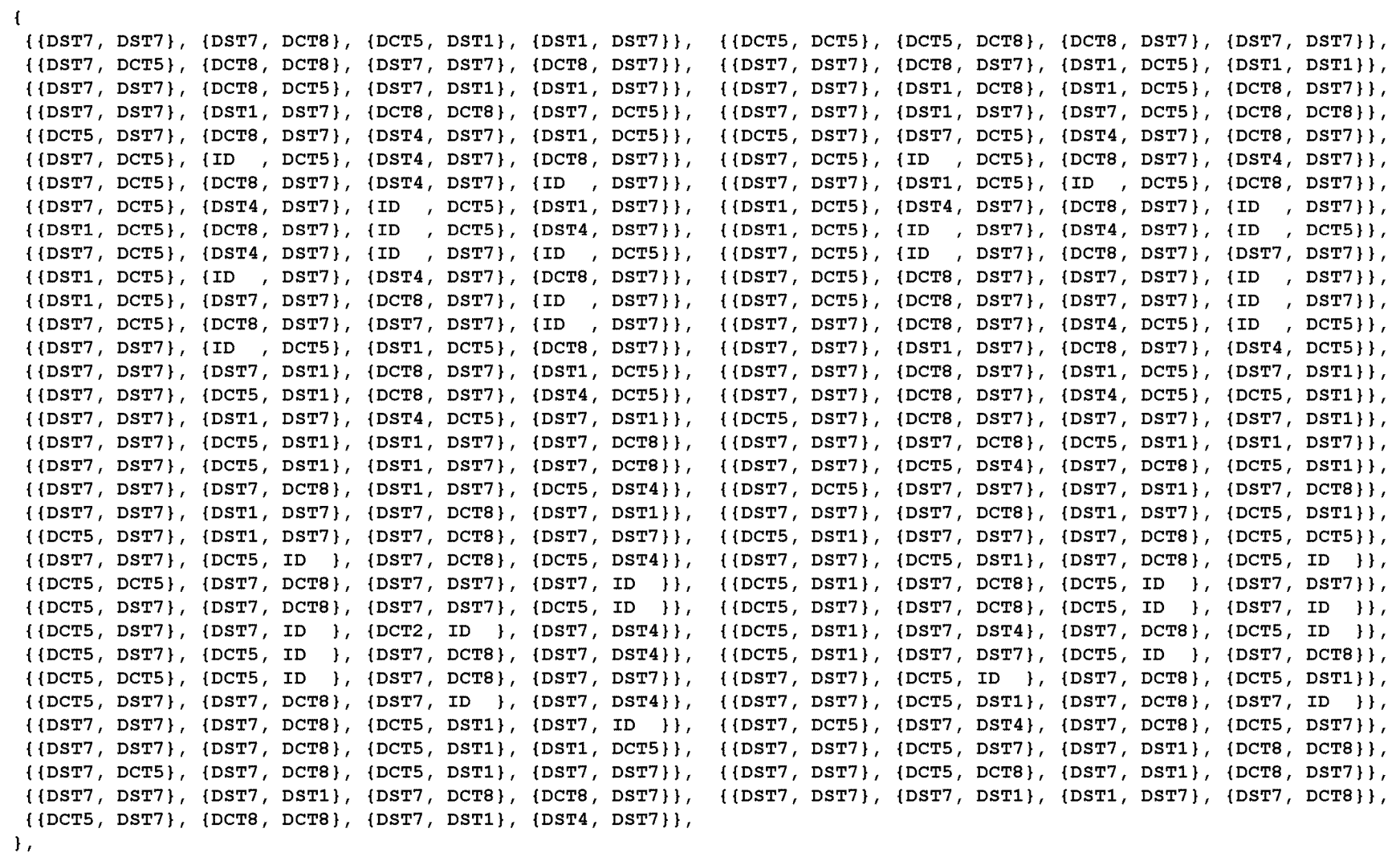
Figure 5C:
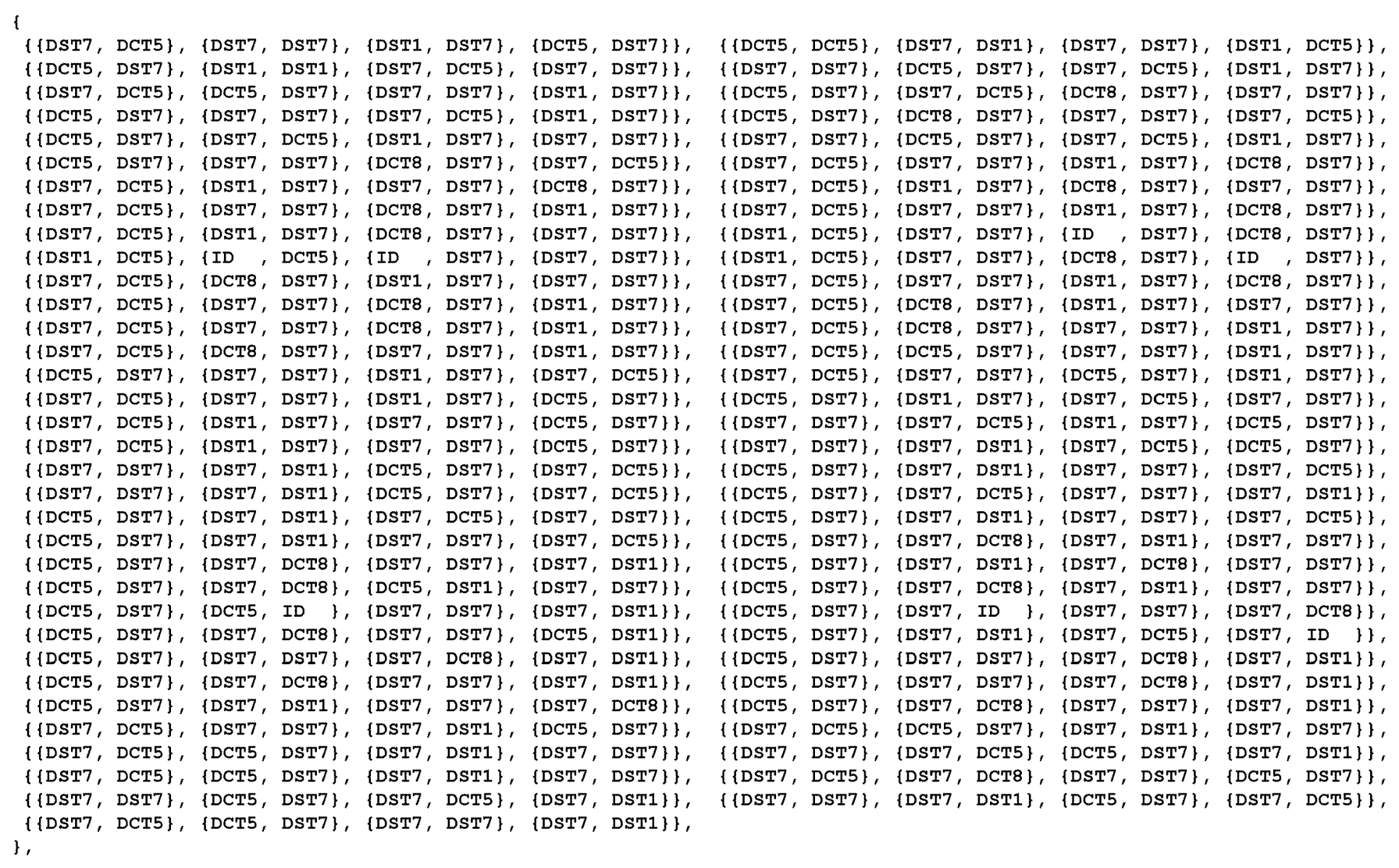
Figure 5D:
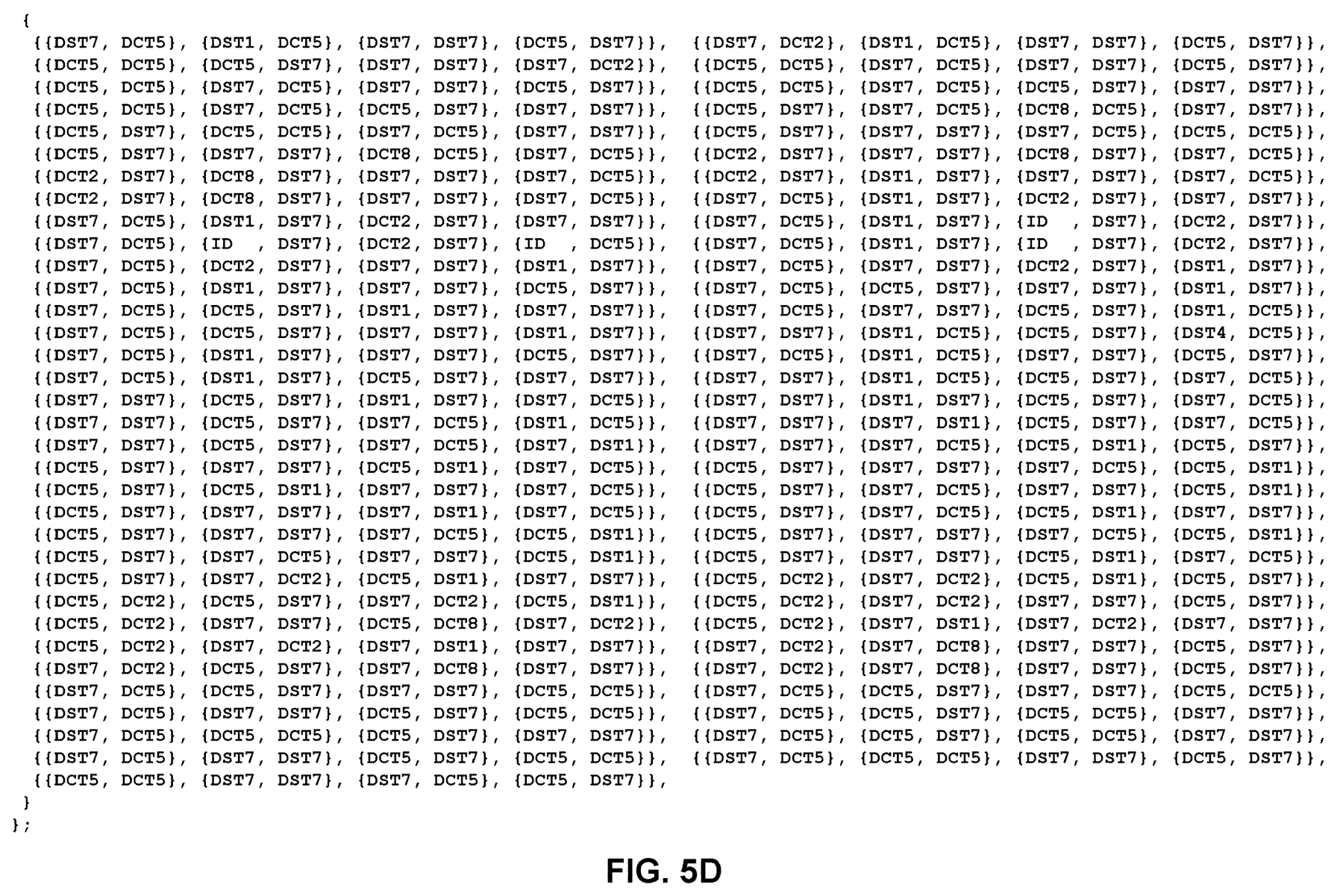

FIGS. 5A-5D is an exemplary look up table that specifies a horizontal/vertical transform pair for a plurality of block sizes and a plurality of intra prediction modes.

FIG. 6 is an exemplary look-up table mapping from block height, width and intra mode to transform pair set index.

DETAILED DESCRIPTION

Figure 2:
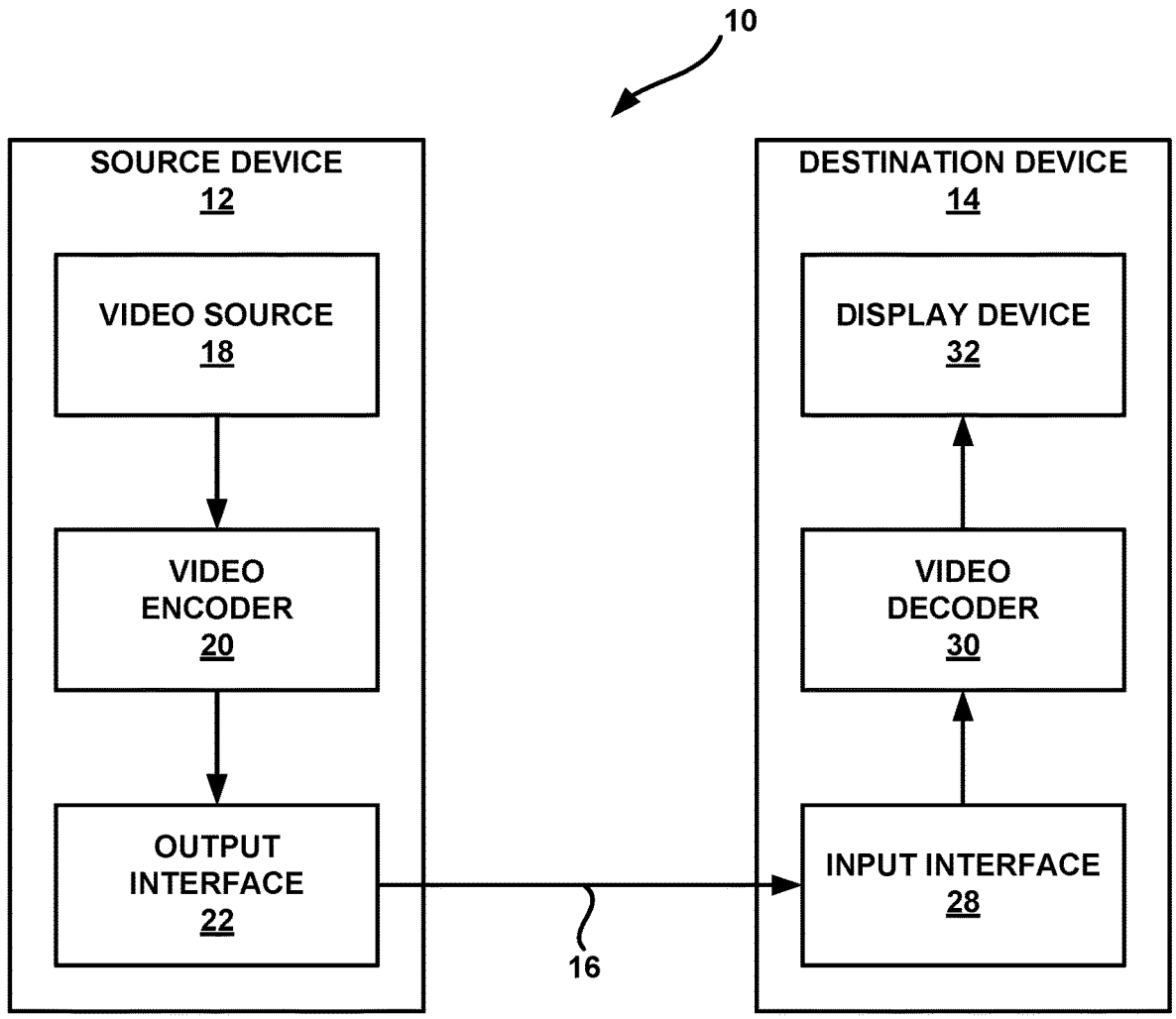
FIG. 2 is a block diagram illustrating an example video coding system that may utilize the techniques described in this disclosure.

This disclosure is related to multiple transforms applied for Intra or Inter prediction residual. The techniques may be used in the context of advanced video codecs, such as extensions of the high efficiency video coding (HEVC) standard or the next generation of video coding standards.

The techniques of the present disclosure potentially improve on the current design of Enhanced Multiple Transform (EMT) also known as Adaptive Multiple Transform (AMT). EMT may use a simple look-table for determining a transform pair based on the Intra prediction mode and a determined EMT index.

Although the modified EMT look-up table in P. Philippe, V. Lorcy, "Proposed improvements to the Adaptive multiple Core transform," JVET-C0222, improved the coding gain of EMT by introducing more flexible horizontal/vertical transform pairs and block size dependency, the look-up table is rather large and irregular which does not have a clean design and largely increases storage burden. Techniques of the present disclosure use a smaller LUT In video coding, a video encoder generates a residual block by subtracting sample values of a predictive block from sample values of an original block of video data. The video encoder divides the residual block into one or more transform blocks and applies a transform (e.g., a discrete frequency transform such as a discrete cosine transform (DCT)) to the one or more transform blocks to transform the residual values in the one or more transform blocks from the pixel domain to the frequency domain. In the frequency domain, the transformed blocks are referred to as coefficient blocks that include one or more transform coefficient values.

During decoding, a video decoder performs the reciprocal process. For instance, the video decoder applies an inverse-transform to a coefficient block to transform the coefficient block to a transform block (e.g., transform from frequency domain to pixel domain). The transform block is one block of a residual block, and the video decoder adds residual values of the residual block to the sample values of the predictive block to reconstruct the current block.

Only for ease of description, this disclosure describes the video encoder and the video decoder as determining a transform used for the encoding and decoding process, respectively. However, it should be understood that the video encoder applies the transform to a transform block to generate a coefficient block and that the video decoder applies an inverse of the transform to the coefficient block to reconstruct the transform block. Accordingly, the transform that the video decoder applies is the inverse of the transform that the video encoder applies. Therefore, in this disclosure, when the video decoder is described as determining a transform and/or applying a transform, it should be understood that the video decoder is determining a transform that is the inverse of the transform determined by the video encoder and/or that the video decoder is applying a transform that is the inverse of the transform applied by the video encoder.

This disclosure describes example techniques for determining the transform that is applied to a transform block of residual values for encoding transform coefficients or applied to a coefficient block of transform coefficients for decoding residual values. For instance, the video encoder and the video decoder may each construct a plurality of transform subsets, each transform subset identifies a plurality of candidate transforms. Candidate transforms refer to different types of transforms such as different types of DCTs and different types of discrete sine transforms (DSTs). The video encoder and the video decoder select transform subset(s) and determine transforms from the selected transform subset(s) that are used for determining a coefficient block from a transform block for video encoding or a transform block from a coefficient block for video decoding.

In this way, the video encoder and the video decoder may determine which transforms to use from a larger set of candidate transforms, allowing for better adaptation to the varying statistics of the transform block without overly burdening the bitstream bandwidth. For instance, some techniques constrain how many transforms are available, which may result in poor coding performance because the statistics of the transform block are such that none of the available transforms perform well. There may be other better transforms but these transforms are unavailable due to the constraints.

In the techniques described in this disclosure, because more transforms are available, the video encoder and the video decoder may use a transform that provides better coding performance than would be possible with a limited set of transforms. Furthermore, as described in more detail, signaling overhead, used to indicate which transform is to be used, is kept low so that coding gains can be achieved while having more transforms available and keeping the impact on bandwidth low.

For example, rather than relying on signaled information in the bitstream, the video decoder may select which transform subset(s) to use based on implicit techniques such as based on intra-prediction mode, location of transform block, etc. The video decoder may then determine which jtransform(s) to use from the selected transform subset(s) based possibly on one or more transform subset indices, for respective ones of the selected transform subset(s), signaled in the bitstream or other factors including but not limited to number of nonzero coefficients, sum of nonzero coefficients, or position of nonzero coefficients in a coefficient block.

Even where the transform subset index is signaled for respective transform subset(s), the signaling overhead may be kept low because the index value spans only the range of the transform subset rather than spanning all possible transforms. For instance, assume there are up to 16 possible transforms, and that a transform subset includes three candidate transforms. In this case, the index value will range from 0 to 2, whereas an index into a list of all transforms would range from 0 to 15. Signaling smaller values such as 0 to 2 may require fewer bits than signaling larger values.

Prior to describing the manner in which transform subsets are constructed and selected, the following describes video coding standards, DCTs and DSTs in general, different types of DCTs and DSTs, and some existing DCT and DST techniques. The disclosure then describes some problems in existing techniques, followed by example techniques that may overcome the problems.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The final HEVC draft specification, and referred to as HEVC WD hereinafter, is available from http://phenix.int-evry.fr/jct/doc_end_user/documents/14_Vienna/wg11/JCTVC-N1003-v1.zip. The final draft of the HEVC standard is: ITU-T H.265, Series H: Audiovisual and Multimedia Systems, Infrastructure of audiovisual services—Coding of moving video, Advanced video coding for generic audiovisual services, The International Telecommunication Union, October 2014, and is available from http://www.itu.int/rec/T-REC-H.265-201410-I/en.

The following is a description of discrete sine and cosine transforms. Transform indicates the process of deriving an alternative representation of the input signal. For example, the transform converts values from the pixel domain to the frequency domain (e.g., in video encoding) or from frequency domain to pixel domain (e.g., in video decoding). Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \cdot \phi_i$$

where $\hat{x}$ can be an approximation or equivalent of x, vector $f=[f_0, f_1, f_2, \ldots, f_{M-1}]$ is called the transform coefficient vector and $\{\Phi_0, \Phi_1, \ldots, \Phi_{M-1}\}$ are the transform basis vectors.

In the scenario of video coding, transform coefficients are roughly non-correlated and sparse, i.e., the energy of the input vector x is compacted only on a few transform coefficients, and the remaining majority transform coefficients are typically close to 0. For instance, when a video encoder transforms a transform block to a coefficient block, the nonzero coefficient values in the coefficient block tend to be grouped together at a top-left corner of the coefficient block, and a majority of the coefficient values are zero. The nonzero coefficients grouped near the top-left corner of the coefficient block reflect low frequency components, whereas coefficient values near the bottom-right corner of the coefficient block, which tend to be zero, reflect high frequency components.

Given the specific input data, the optimal transform in terms of energy compaction is the so-called Karhunen-Loeve transform (KLT), which uses the eigen vectors of the covariance matrix of the input data as the transform basis vectors. Therefore, KLT is actually a data-dependent transform and does not have a general mathematical formulation. However, under certain assumptions, e.g., the input data forms a first-order stationary Markov process, it has been proven in the literature that the corresponding KLT is actually a member of the sinusoidal family of unitary transforms, which is described in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\Phi_m(k) = A \cdot e^{ik\epsilon} + B \cdot e^{-ik\theta}$$

where e is the base of the natural logarithm approximately equal to 2.71828, A, B, and θ are complex in general, and depend on the value of m.

Several well-known transforms including the discrete Fourier, cosine, sine, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete discrete cosine transform (DCT) and discrete sine transform (DST) families include 16 transforms based on different types, i.e., different values of A, B, and e, and a complete definition of the different types of DCT and DST are given below.

Assume the input N-point vector is denoted as $x=[x_0, x_1, \ldots, x_{N-1}]^T$ and is transformed to another N-point transform coefficient vector denoted as $y=[y_0, y_1, \ldots, y_{N-1}]^T$ by multiplying a matrix, the process of which can be further illustrated according to one of the following transform formulation, wherein k is the index of a transform coefficient of y, ranging from 0 through N−1, inclusive, $w_0$ and $w_1$ are two constants defined in the following transform formulae for each type of DCT and DST, $x_n$ indicates the nth element of the input vector x:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n, \text{ where}$$

$$w_0 = \begin{cases} \frac{1}{\sqrt{2}}, & \text{if } n=0 \text{ or } n=N-1 \\ 1, & \text{otherwise} \end{cases},$$

$$w_1 = \begin{cases} \frac{1}{\sqrt{2}}, & \text{if } k=0 \text{ or } k=N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

$$\text{where } w_0 = \begin{cases} \frac{1}{\sqrt{2}}, & \text{if } k=0 \\ 1, & \text{otherwise} \end{cases}$$

DCT Type-III (DCT-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

$$\text{where } w_0 = \begin{cases} \frac{1}{\sqrt{2}}, & \text{if } n=0 \\ 1, & \text{otherwise} \end{cases}$$

DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = N-1 \\ 1, & \text{otherwise} \end{cases}$ DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otherwise} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N+0.5}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \sin\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = N-1 \\ 1, & \text{otherwise} \end{cases}$ The above provides examples of different DCT and DST types, all-in-all there are 16 transform types. The transform type is specified by the mathematical formulation of the transform basis function. The transform type and the transform size should not be confused. The transform type refers to basis function, whereas the transform size refers to the size of the transform. For instance, a 4-point DST-VII and 8-point DST-VII have the same transform type, regardless of the value of N (e.g., 4-point or 8-point).

Without loss of generality, all the above transform types can be represented using the below generalized formulation:

$$y_m = \sum_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform. The formulae for DCT Type-I~DCT Type-VIII and DST Type-I~DST Type-VIII may be rewritten as matrix multiplication, where the transform matrix T is a matrix with floating-point numbers. In an exemplary video codec, instead of the floating-point transform matrix, the transform matrix T may be approximated as an integer matrix.

It is also noted that, the above transform formulations, which are applied on the 1-D input data x, can be represented in matrix multiplication form as below $$y = T \cdot x$$

where T indicates the transform matrix, x indicates the input data vector, and y indicates the output transform coefficients vector.

For instance, the video encoder may perform the matrix multiplication y=T·x to generate the transform coefficient vector. The video decoder may perform the inverse matrix multiplication to generate the transform vector from the transform coefficient vector.

The transforms as introduced above are applied on 1-D input data, and transforms can be also extended for 2-D input data sources. Supposing X is an input M×N data array. The typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

where C and R denotes the given M×M and N×N transform matrices, respectively.

From the formulation, it can be seen that C applies 1-D transforms for the column vectors of X, while R applies 1-D transforms for the row vectors of X In the later part of this disclosure, for simplicity denote C and R as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X_{(i \cdot N + j)}' = X_{i,j}$$

Then a 1-D transform T' is applied for X' as below:

$$Y = T' \cdot X$$

where T' is an (M*N)×(M*N) transform matrix.

In video coding, separable 2-D transforms typically requires much less operation (e.g., addition, multiplication) counts as compared to 1-D transform. As described in more detail below, this disclosure describes example techniques with which a video encoder and a video decoder select the left and right transforms.

For instance, the video encoder and the video decoder may determine a plurality of transform subsets, each transform subset identifying a plurality of candidate transforms. As an example of the 16 possible transforms (e.g., DCT-1 to DCT-8 and DST-1 to DST-8), the video encoder and the video decoder may determine three transform subsets and each of the transform subsets includes two or more of the 16 transforms. The video encoder and the video decoder may select one of the three transform subsets and determine the left transform (e.g., C) from the selected transform subset and select one of the three transform subsets and determine the right transform (e.g., R) from the selected transform subset. The selected transform subsets may be different subsets or the same subsets.

The following is a description of transform types applied in HEVC. In some video codecs, such as H.264/AVC, an integer approximation of the 4-point and 8-point Discrete Cosine Transform (DCT) Type-II is always applied for both Intra and Inter prediction residual. Intra prediction residual refers to the residual from intra-prediction and Inter prediction residual refers to the residual from inter-prediction. The residual, inter-predication, and intra-prediction are all described in more detail below. In general, the residual block is divided into a plurality of transform blocks. In video encoding, the transforms are applied to each of the transform blocks to generate coefficient blocks. In video decoding, the transforms are applied to each of the coefficient blocks to generate the transform blocks and reconstruct the residual block.

To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proved and experimentally validated that DST Type-VII is more efficient than DCT Type-II for residuals vectors generated along the Intra prediction directions, e.g., DST Type-VII is more efficient than DCT Type-II for row residual vectors generated by the horizontal Intra prediction direction. See, for example, J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729.

Figures 1A, 1B, 1C, 1D:
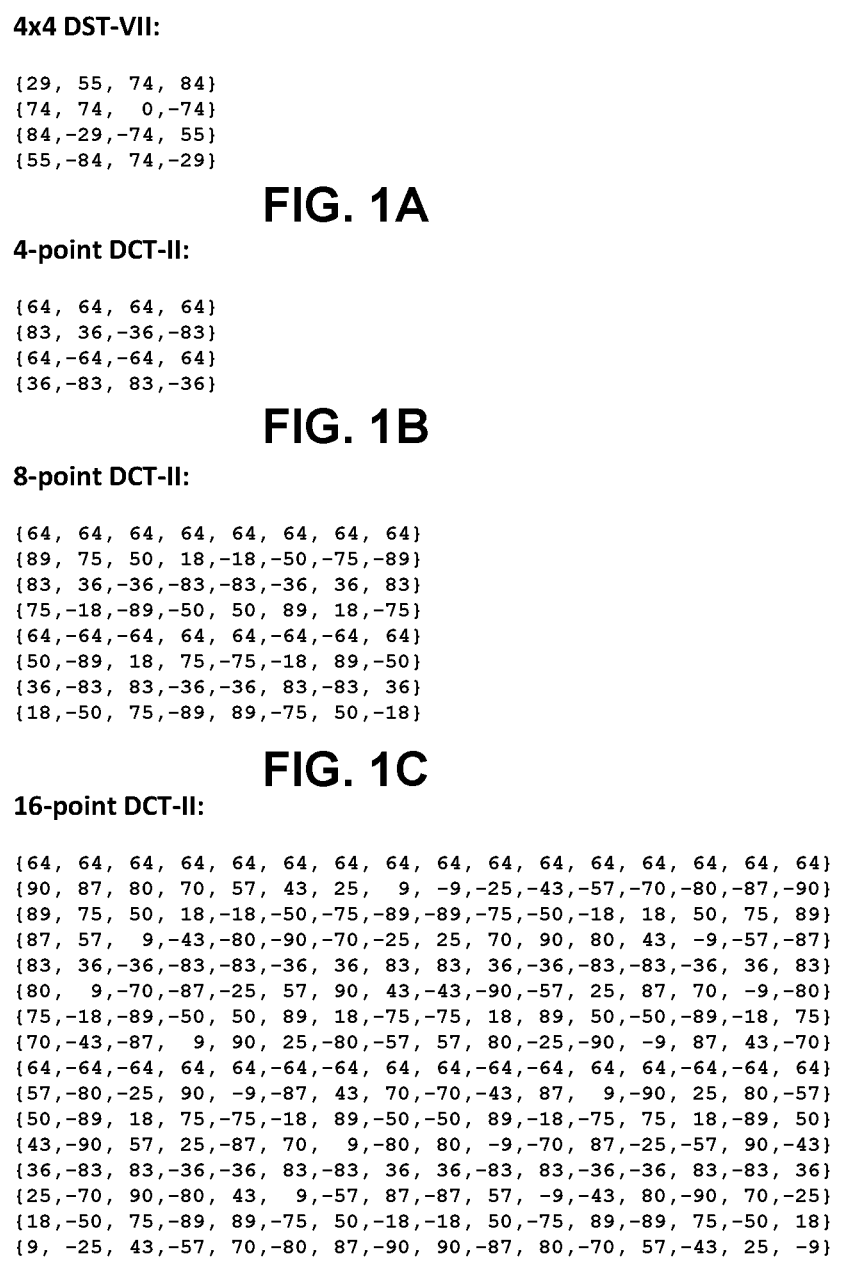

In HEVC, an integer approximation of 4-point DST Type-VII is applied only for 4×4 luma Intra prediction residual blocks (luma intra prediction residual blocks are described in more detail below). The 4-point DST-VII used in HEVC is shown in FIG. 1A.

In HEVC, for residual blocks that are not 4×4 luma Intra prediction residual blocks, integer approximations of the 4-point, 8-point, 16-point and 32-point DCT Type-II are also applied. FIG. 1B illustrates an example of the 4-point DCT-II; FIG. 1C illustrates an example of the 8-point DCT-II; FIG. 1D illustrates an example of the 16-point DCT-II; and FIG. 1E illustrates an example of the 32-point DCT-II. FIGS. 1A-1E illustrate examples of differently sized DCTs of type II, and like FIGS. 1A-1E, there are examples of N-point DCTs and DSTs of different types.

FIG. 2 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for enhanced multiple transforms for prediction residual in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 2 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 2, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 2, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, extensions of HEVC, or possibly a next generation of video coding standards in development. For ease of understanding only, the following provides some information regarding the HEVC standard. However, the techniques described in this disclosure should not be considered limited to the HEVC standard.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. As described in more detail, this disclosure describes example ways in which video encoder 20 determines the transforms to use for generating the coefficient blocks.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL)

units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU.

Video decoder 30 may perform inverse transforms on the transform coefficient blocks to reconstruct transform blocks associated with the TUs of the current CU. This disclosure describes example techniques for the way in which video decoder 30 determines the transforms that are used to perform the inverse transforms on the transform coefficient blocks.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As described above, a CU includes one or more TUs. The following describes transform scheme based on residual quadtree in HEVC. To adapt the various characteristics of the residual blocks, a transform coding structure using the residual quadtree (RQT) is applied in HEVC, which is briefly described in http://www.hhi.fraunhofer.de/fields-of-competence/image-processing/research-groups/image-video-coding/hevc-high-efficiency-video-coding/transform-coding-using-the-residual-quadtree-rqt.html.

As described above, each picture is divided into CTUs, which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

Figure 3:
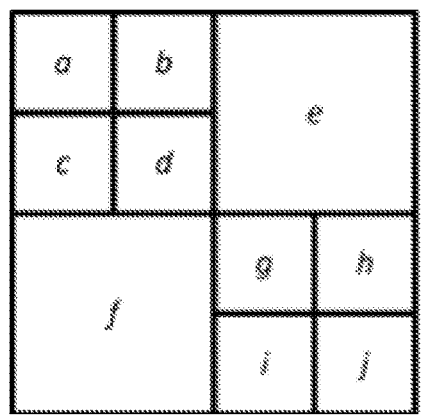
FIG. 3 is a conceptual diagram illustrating an example of a transform scheme based on residual quadtree in high efficiency video coding (HEVC).
Figure 3:
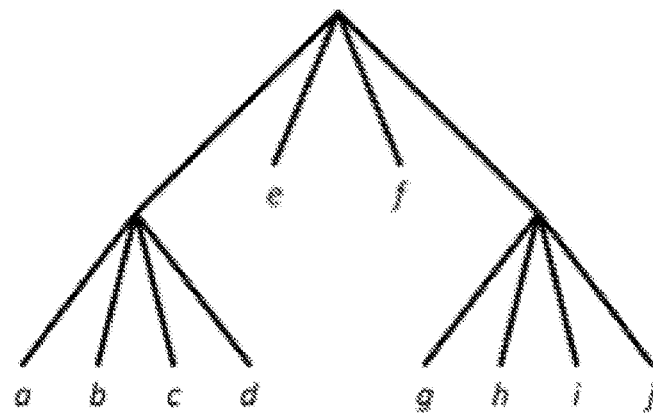

FIG. 3 shows an example where a CU includes 10 TUs, labeled with the letters "a" to "j," and the corresponding block partitioning. Each node of the RQT is a transform unit (TU). The individual TUs are processed in depth-first tree traversal order, which is illustrated in FIG. 3 as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision (e.g., by video encoder 20), for example, based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size, and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB (coding block) cannot be split any further if each included TB (transform block) reaches the maximum allowed transform size, e.g., 32×32.

All these parameters interact and influence the RQT structure. Consider a case in which the root CB size is 64×64, the maximum depth is equal to zero, and the maximum transform size is equal to 32×32. In this case, the CB has to be partitioned at least once, since otherwise it would lead to a 64×64 TB, which is not allowed. In HEVC, larger size transforms, e.g., 64×64 transforms, are not adopted mainly due to its limited benefit considering and relatively high complexity for relatively smaller resolution videos.

The RQT parameters, i.e., maximum RQT depth, minimum and maximum transform size, are transmitted in the bitstream at the sequence parameter set level. Regarding the RQT depth, different values can be specified and signaled for intra and inter coded CUs (i.e., intra-predicted encoded CUs or inter-predicted decoded CUs or intra-predicted encoded CUs or inter-predicted CUs).

The quadtree transform is applied for both Intra and Inter residual blocks. Typically the DCT-II transform of the same size of the current residual quadtree partition is applied for a residual block. However, if the current residual quadtree block is 4×4 and is generated by Intra prediction, the above 4×4 DST-VII transform is applied.

Figure 4:
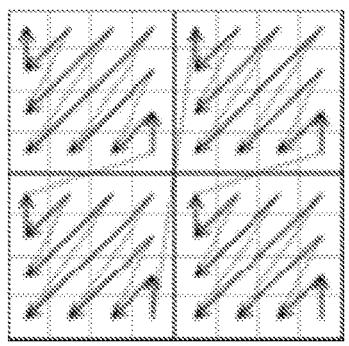
FIG. 4 is a conceptual diagram illustrating an example of a coefficient scan based on coding group in HEVC.

The following describes coefficient coding in HEVC. Regardless of the TU size, the residual of the transform unit is coded with non-overlapped coefficient groups (CG), and each contains the coefficients of a 4×4 block of a TU. For example, a 32×32 TU has totally 64 CGs, and a 16×16 TU has totally 16 CGs. The CGs inside a TU are coded according to a certain pre-defined scan order. When coding each CG, the coefficients inside the current CG are scanned and coded according to a certain pre-defined scan order for 4×4 block. FIG. 4 illustrates the coefficient scan for an 8×8 TU containing 4 CGs.

For each color component, one flag may be firstly signaled to indicate whether current transform unit has at least one non-zero coefficient. If there is at least one non-zero coefficient, the position of the last significant coefficient in the coefficient scan order in a transform unit is then explicitly coded with a coordination relative to the top-left corner of the transform unit. The vertical or horizontal component of the coordination is represented by its prefix and suffix, wherein prefix is binarized with truncated rice (TR) and suffix is binarized with fixed length.

last_sig_coeff_x_prefix specifies the prefix of the column position of the last significant coefficient in scanning order within a transform block. The values of last_sig_coeff_x_prefix shall be in the range of 0 to (log 2 TrafoSize<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2 TrafoSize<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX is derived as follows:

If last_sig_coeff_x_suffix is not present, the following applies:

LastSignificantCoeffX=last_sig_coeff_x_prefix

Otherwise (last_sig_coeff_x_suffix is present), the following applies:

LastSignificantCoeffX=(1<<((last_sig_coeff_x_prefix>>1)−1))*(2+(last_sig_coeff_x_prefix & 1))+last_sig_coeff_x_suffix last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:

If last_sig_coeff_y_suffix is not present, the following applies:

LastSignificantCoeffY=last_sig_coeff_y_prefix

Otherwise (last_sig_coeff_y_suffix is present), the following applies:

LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows:

(LastSignificantCoeffX,LastSignificantCoeffY)=Swap(LastSignificantCoeffX,LastSignificantCoeffY)

With such a position coded and also the coefficient scanning order of the CGs, one flag is further signaled for CGs except the last CG (in scanning order), which indicates whether it contains non-zero coefficients. For those CGs that may contain non-zero coefficients, significant flags, absolute values of coefficients and sign information may be further coded for each coefficient according to the pre-defined 4×4 coefficient scan order.

As described above, the techniques described in this disclosure describe ways to determine the transform that video encoder 20 applies to convert a transform block to a coefficient block and ways to determine the transform that video decoder 30 applies (e.g., as an inverse transform) to convert a coefficient block to a transform block. The following describes multiple transform for intra and inter prediction residual (e.g., different transform types for when the residual block is generated from intra-prediction and for when the residual block is generated from inter-prediction). Although many of the techniques are described herein with respect to intra and inter prediction, the techniques may also be applicable to other coding modes that utilize transforms as part of coding residual data.

In some cases, despite the fact that DST Type-VII can efficiently improve the intra coding efficiency compared to the conventional DCT Type-II, the transform efficiency is relatively limited because prediction residuals present various statistics, and fixed usage of DCT Type-II and DST Type-VII cannot efficiently adapt to all the possible cases. Some techniques have been proposed to adapt to different cases.

In S.-C. Lim, D.-Y. Kim, S. Jeong, J. S. Choi, H. Choi, and Y.-L. Lee, "Rate-distortion optimized adaptive transform coding," Opt. Eng., vol. 48, no. 8, pp. 087004-1-087004-14, August 2009, a new transform scheme which adaptively employs integer version of DCT or DST for prediction residue is proposed, for each block it is signaled whether the DCT or DST transform is used for the prediction residue. In Y. Ye and M. Karczewicz, "Improved H.264 intra coding based on bidirectional intra prediction, directional transform, and adaptive coefficient scanning," in Proc. 15th IEEE Int. Conf. Image Process., October 2008, pp. 2116-2119, it has been proposed that each Intra prediction mode can be mapped to a unique pair of transform (C and R), a pre-defined as KLT pair, so that mode dependent transform (MDDT) applies. This way, different KLT transforms can be used for different Intra prediction modes; however, which transform to be used is predefined and dependent on the intra prediction mode.

In X. Zhao, L. Zhang, S. W. Ma, and W. Gao, "Video coding with rate-distortion optimized transform," IEEE Trans. Circuits Syst. Video Technol., vol. 22, no. 1, pp. 138-151, January 2012, however, more transforms can be used and an index to the transforms from a pre-defined set of transform candidates which are derived from off-line training process is explicitly signaled. Similar to MDDT, each Intra prediction direction may have its unique set of pairs of transforms. An index is signaled to specify which transform pair is chosen from the set. For example, there are up to four vertical KLT transforms and up to four horizontal KLT transforms for smallest block sizes 4×4; therefore 16 combinations may be chosen. For larger block sizes, less number of combinations are used. The proposed method in "Video coding with rate-distortion optimized transform" applies to both Intra and Inter prediction residual. For Inter prediction residual, up to 16 combinations of KLT transforms can be chosen and the index to one of the combinations (four for 4×4 and sixteen for 8×8) is signaled for each block.

In A. Saxena and F. Fernandes, "DCT/DST-based transform coding for intra prediction in image/video coding," IEEE Trans. Image Processing and C. Yeo, Y. H. Tan, Z. Li, and S. Rahardja, "Mode-dependent transforms for coding directional intra prediction residuals," IEEE Trans. Circuits Syst. Video Technol., vol. 22, no. 4, pp. 545-554,2012, multiple transforms are used; however, instead of using KLT transforms (which typically need to be trained), either DCT (DCT-II) or DST (DST-VII) is used for a transform unit (with both left and right transforms (e.g., C and R) being the same) and which one to be used is determined by a signaled flag. In F. Zou, O. C. Au, C. Pang, J. Dai, and F. Lu, "Rate-Distortion Optimized Transforms Based on the Lloyd-Type Algorithm for Intra Block Coding," IEEE Journal of Selected Topics in Signal Processing, Volume: 7, Issue: 6, November 2013, several pre-defined KLT transform pairs are used, and an index to a transform pair is signaled (instead of derived) for a coding unit, so that each transform unit of the coding unit uses the same pair of transforms.

In J. An, X. Zhao, X. Guo and S. Lei, "Non-CE7: Boundary-Dependent Transform for Inter-Predicted Residue," JCTVC-G281, multiple transforms are chosen for inter predicted residual of TUs according to their locations within a CU. Both the C and R transforms are chosen from DST-VII and the flipped version of DST-VII. Therefore, up to four combinations are possible for the TUs within a CU. However, since the combination is fully determined by the location of the PUs, there is no need to signal which combination is being used.

In addition to DCT-II and 4×4 DST-VII which have been employed in HEVC, an Enhanced Multiple Transform (EMT) scheme may be used for residual coding for both inter and intra coded blocks. The scheme may use multiple selected transforms from the DCT/DST families other than the current transforms in HEVC. These transform matrices are DST-VII, DCT-VIII, DST-I and DCT-V. Table 1 shows the basis functions of the selected DST/DCT.

In order to keep the orthogonality of the transform matrix, the transform matrixes may be quantized more accurately than the transform matrixes in HEVC. To keep the intermediate values of the transformed coefficients within the range of 16-bit, after horizontal and after vertical transform, all the coefficients may be right shifted by 2 more bits, comparing to the right shift used in the current HEVC transforms.

The EMT applies to the CUs with both width and height smaller than for equal to 64, and whether EMT applies or not is controlled by a CU level flag. When the CU level flag is equal to 0, DCT-II is applied in the CU to encode the residue. For luma coding block within an EMT enabled CU, two additional flags are signaled to identify the horizontal and vertical transform to be used.

For intra residue coding, due to the different residual statistics of different intra prediction modes, a mode-dependent transform candidate selection process is used. Three transform sub-sets have been defined as shown in Table 1, and the transform subset is selected based on the intra prediction mode, as specified in Table 2.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the sub-set conception, a transform subset is first identified based on Table 1 using the Intra prediction mode of a CU with the CU-level EMT flag is equal to 1. After that, for each of the horizontal and vertical transform, one of the two transform candidates in the identified transform subset, in Table 2, is selected based on explicitly signaled with lag.

TABLE 2

Selected (H)orizontal and (V)ertical transform sets for each Intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

For inter prediction residual, however, only one transform set, which consists of DST-VII and DCT-VIII, may be used for all inter modes and for both horizontal and vertical transforms.

In P. Philippe, V. Lorcy, "Proposed improvements to the Adaptive multiple Core transform," JVET-C0222, a modified design of EMT is proposed which introduced using DST-IV and Identity Transform (ID). The ID transform uses a transform core equal to the identify matrix, so ID transform is simply copying the input to output and can be considered as skipping the transform in either the horizontal or vertical direction. The utilization of DST-4 and ID transforms are specified by a big look-up table with no regular pattern. These look-up table specifies the horizontal/vertical transform pair for each block size (4 different block sizes including 4×4, 8×8, 16×16, 32×32) and each Intra prediction mode (67 Intra modes), as shown in FIGS. 5A-5D.

This modification of the design of EMT shows improved coding gain, but the look-up table is too big for a clean design and reasonable storage burden. In addition, in the latest JEM codec, a quadtree plus binary tree (QTBT) block partition structure is used which includes more flexible rectangular block sizes. To accommodate the proposed modified design with QTBT, the look-up table size will explosively increase which make the coding gain improvement more questionable.

The design of EMT uses a simple look-table for specifying the transform utilization based Intra prediction mode and EMT index, which may lack flexibility for different block sizes and horizontal/vertical transform pair.

Although the modified EMT look-up table in JVET-C0022 improved the coding gain of EMT by introducing more flexible horizontal/vertical transform pair and block size dependency, the look-up table (LUT) is rather large and irregular which is not a clean design and largely increases storage burden which requires substantial memory to store.

In some examples of the present disclosure, one or more of the following techniques are described to address one or more of the above mentioned problems. However, it is not a requirement that the following techniques address one or more of the above mentioned problems. The following techniques may be applied individually. In some cases, any combination of the example techniques may be applied. For instance, video encoder 20 and video decoder 30 may apply the techniques individually, or, in some cases, apply any combination of the one or more techniques.

In some examples of the present techniques, a LUT may be used that is of smaller size than used in JVET-C0022 but offers similar performance.

In some examples, instead of allowing all possible combinations of different horizontal and vertical transforms among a selected set of transform, e.g. {DST-7, DST-4, DCT-8, DCT-5, DST-1} or {DST-7, DST-4, DCT-8, DCT-5, DST-1, ID}, only a much smaller number of horizontal/vertical transform pairs are used. In this example, the number of possible transform types are constrained, e.g., less efficient combinations. From all possible combinations, 25 without the ID transform and 36 including the ID transform, only a subset may be used. Thus, where the set of transforms may include N transforms (where N equals, e.g., 5 or 6 transforms), all vertical and horizontal pair combinations of N transforms would equal $N^2$ horizontal and vertical transform pair combinations. Thus, fewer than $N^2$ horizontal and vertical transform pair combinations may be used.

Less efficient combinations may be determined based on testing using all transform combinations and reducing the number of allowed combinations based on the combinations that were the least used. Thus, the universe of available transforms may be reduced one by one until a performance gains are reduced or reversed. Where small or no performance improvements are calculated after a further reduction in transform combinations, the set of transform combinations may be determined.

In certain examples, a typical number of the much smaller number of horizontal/vertical transform pairs can be 10, 11, 12, 13, 14 etc. when the total number of possible combinations of different horizontal and vertical transforms can be 25, 36 or even larger.

In other examples, the limited horizontal/vertical transform pairs can be selected from, but not limited to 14 pairs: {DST-7, DST-7}, {DST-4, DST-4}, {DST-4, DST-7}, {DST-7, DST-4}, {DCT-8, DST-7}, {DCT-8, DST-4}, {DST-7, DCT-5}, {DCT-5, DST-7}, {DST-7, DCT-8}, {DST-4, DCT-5}, {DST-1, DST-7}, {DST-1, DST-4}, {DST-1, DCT-5}, {DCT-5, DCT-5}.

In other examples, the limited horizontal/vertical transform pairs applied for angular intra prediction modes can be selected from, but not limited to 10 pairs: {DST-7, DST-7}, {DST-4, DST-4}, {DST-4, DST-7}, {DST-4, DCT-5}, {DST-7, DCT-5}, {DCT-8, DST-7}, {DCT-8, DST-4}, {DCT-5, DST-7}, {DST-1, DST-7}, {DST-1, DST-4}.

In further examples, the selection of one horizontal/vertical transform pair from all the available horizontal/vertical transform pairs can depend on all or partial of the decoded information, including but not limited to: EMT flag, EMT index, non-separable secondary transform (NSST) index, Intra prediction modes, RQT depth, block width/height, quantized coefficients, and relative location of TU inside a CU or PU. The EMT index, for example, may be used to determine whether the ID transform is used.

In some examples, instead of allowing all possible combinations of N different horizontal/vertical transform pairs, where N is the number of available transform candidates in EMT, several sets of transform pairs are pre-defined, with each set specifies one specific combination of N pairs of horizontal/vertical transform, and the number of available transform pair sets is much smaller than the total number of possible combinations of N different horizontal/vertical transform pairs.

A typical example number of the pre-defined transform pair sets can be but not limited to 10, 11, 12, 13, and 14.

An example of 10 transform pair sets for N (taking N equals 4 as an example) horizontal/vertical transform pairs are shown below, where each line represents a transform pair set which includes four transform pairs, and each transform pair indicates a horizontal and vertical transform combination:

{{DST4, DST4}, {DST7, DST7}, {DST4, DCT8}, {DCT8, DST4}}, {{DST4, DST7}, {DST4, DCT5}, {DCT5, DST7}, {DST1, DCT5}}, {{DST7, DST4}, {DST7, DCT5}, {DCT5, DST4}, {DST1, DCT5}}, {{DST7, DST7}, {DST7, DCT5}, {DCT5, DST7}, {DST1, DCT5}}, {{DST7, DST7}, {DST7, DCT8}, {DCT8, DST7}, {DCT5, DCT5}}, {{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST7, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}}

This set of 10 transform pair sets may be used for, e.g., planar, DC, horizontal, and vertical, and angular prediction modes. The transform pair sets applied for angular intra prediction modes can be selected from, but not limited to: {{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST4, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}}

In some examples, the selection of transform pair set may depend on all or partial of the decoded information, including but not limited to: EMT flag, EMT index, NSST index, Intra prediction modes, RQT depth, block width/height, quantized coefficients, and relative location of TU inside a CU or PU.

In some examples, when applying a certain transform type, for example DST-4, it is limited that it is only applied for certain block sizes.

In some further examples, for vertical transform, DST-4 can be only applied for blocks with height smaller than or equal to a certain size, for example 4 or 8. For horizontal transforms, DST-4 can be limited to being applied to blocks with widths smaller than or equal to a certain size, for example, 4 or 8. This would limit the use of transform DST-4 for smaller block sizes which typically includes highly textured blocks. This is because, practically, the application of the DST-4 transform is more efficient for smaller texture blocks.

In some examples, when applying the ID transform, the ID transform may be only applied as the vertical (horizontal) transform when the Intra prediction direction is within a given range of angle relative to the horizontal (vertical) prediction direction, or the Intra mode index is within a given threshold relative to the mode index of the horizontal (vertical) prediction direction. Thus, for angles that are relatively close to horizontal or vertical, the ID transform may be used. The threshold refers to an absolute value of the difference between the prediction mode and the prediction mode for horizontal (18) and/or vertical (50). The threshold would thus be based on the distance between the intra prediction angle and horizontal or vertical. In some examples, the given threshold value can be pre-defined, an example of the threshold value can be, but not limited to 8, 6, 4, 2 and 0. Where the threshold is 0, only horizontal and vertical prediction modes may use the ID transform.

In some examples, the given threshold value may depend on decoded information, including but not limited to: EMT flag, EMT index, NSST index, RQT depth, block width/height (e.g., block size), quantized coefficients, and relative location of TU inside a CU or PU.

In some examples, when the transform selection depends on Intra prediction mode, the rule of horizontal and vertical transform pair selection may be defined for only part of the Intra prediction modes, for the remaining Intra prediction modes, the transform pair selection may be derived using the already defined part of the Intra prediction modes according to the symmetry between different Intra prediction modes. Thus, only half of the transform pairs need to be stored as the others may be derived by swapping the vertical and horizontal transforms in the pair.

In some examples, when 67 angular Intra prediction modes are used, with mode 0 being Planar modes, mode 1 being DC mode, mode 2~66 being different Angular prediction modes, and 18 being horizontal prediction mode, 50 being vertical prediction mode, 34 being diagonal prediction mode, the horizontal and vertical transform pair selection is only defined for Intra prediction mode 0~34. When selecting the horizontal transform and vertical transform for a block size M×N using Intra mode i and i is larger than 34, the horizontal transform and vertical transform pair for the block size N×M using Intra prediction mode 68-i is firstly derived as $\{T_H, T_V\}$, then $\{T_V, T_H\}$ are used as the horizontal and vertical transform pair for the current M×N block predicted by intra mode i.

In some examples, when the transform selection depends on decoded information, including but not limited to: NSST index, Intra prediction modes, RQT depth, block width/height, quantized coefficients, and relative location of TU inside a CU or PU, the transform selection may share the same rule and merged for cases with different values of decoded information. Thus, the same transform pair sets may be used for large block sizes (e.g., 4×4, 4×8 . . . 4×128) as well.

For example, when the transform selection depends on block sizes/shape, the same transform selection rule may be applied for large block sizes like 32×32, 32×64, 64×32, and 64×64. Thus, the same transform pair set may be used for large size blocks to further reduce the size of a lookup table.

In some examples, when the transform selection depends on Intra prediction mode, the same transform selection rule may be applied for multiple Intra prediction mode like intra prediction mode 33, 34 and 35 which performs diagonal intra prediction with prediction angle close to each other. Thus, for some angular prediction modes, a single set of transform pairs may be used to reduce the LUT size.

In an example, the vertical and horizontal transform pair $\{T_V, T_H\}$ may be derived. Ten transform pair sets may be pre-defined:

transformSet[10] [4] [2] =
{
{ {DST4, DST4}, {DST7, DST7}, {DST4, DCT8}, {DCT8, DST4} },
{ {DST4, DST7}, {DST4, DCT5}, {DCT5, DST7}, {DST1, DCT5} }, -continued { {DST7, DST4}, {DST7, DCT5}, {DCT5, DST4}, {DST1, DCT5} },
{ {DST7, DST7}, {DST7, DCT5}, {DCT5, DST7}, {DST1, DCT5} },
{ {DST7, DST7}, {DST7, DCT8}, {DCT8, DST7}, {DCT5, DCT5} },
{ {DST4, DST4}, {DST4, DCT5}, {DCT8, DST4}, {DST1, DST4} },
{ {DST4, DST4}, {DST4, DCT5}, {DCT8, DST4}, {DST1, DST7} },
{ {DST4, DST7}, {DST7, DCT5}, {DCT8, DST7}, {DST1, DST7} },
{ {DST7, DST7}, {DST7, DCT5}, {DCT8, DST7}, {DST1, DST7} },
{ {DST7, DST7}, {DST7, DCT5}, {DCT5, DST7}, {DST1, DST7} },
};

The look-up table mapping from block height (the first array value), width (the second array value)—the first two values representing block sizes from 4×4 through 64×64, and intra mode (the third array value) to transform pair set index (0~9) may be pre-defined, as shown in FIG. 6. 35 types of blocks are defined in the array of FIG. 6. This is because symmetry is used to represent other intra prediction modes.

Given the block height H, width W, Intra prediction mode intraMode, EMT transform candidate index trIdx, the vertical and horizontal transform pair $\{T_V, T_H\}$, are derived as below, where DIA_IDX is the diagonal Intra prediction index (with, e.g., the value 34 that may be a hardcoded constant) and min( ) is a function which returns the minimum value function:

```
if ( intraMode>DIA_IDX )
    {
    Int transformSetIdx = transformSetIdxLut[log2 (W)-
2][min(log2(H)-2,2)][68-intraMode];
        T_V = transformSet[transformSetIdx][trIdx][1];
        T_H = transformSet[transformSetIdx][trIdx][0];
    }
    else
    {
    Int transformSetIdx = transformSetIdxLut[log2(H)-
2][min(log2(W)-2,2)][intraMode];
        T_V = transformSet[transformSetIdx][trIdx][0];
        T_H = transformSet[transformSetIdx][trIdx][1];
    }
```

Then $T_V$ and $T_H$ may be applied as the vertical and horizontal transform types.

Thus, the transform set may be selected from the ten sets defined in transformSet[10] [4] [2]. Which of the ten sets is selected based on the value in trans formSetIdxLut[5] [3] [35] (i.e., a value from 0 to 9) which corresponds to the first array entry in trans formSet[10] [4] [2]. In the "if" case above, the value is looked up directly (e.g., where the intra prediction mode is less than 34 the value of DIA_IDX). Otherwise (the "else" case), due to symmetry, $T_v$ and $T_H$ are swapped. Note also that values in trans formSetIdxLut[5] [3] [35] are determined based the $\log_2$ of the height and width minus 2 to convert block sizes to array entries.

For example, in a block of size 64×64, using intra prediction mode 35, with a transform candidate index of 1 an encoder 20 or decoder 30 may determine whether the intramode is greater than DIA_IDX. Since it is, encoder 20 or decoder 30 may determine a value for transformSetIdx by performing a lookup in transformSetIdxLut (shown in FIG. 6). The lookup is at transformSetIdxLut[log 2(W)−2][min (log 2(H)−2,2)][68−intraMode] which evaluates to: transformSetIdxLut[4][2][33], which is 9. Encoder 20 or decoder 30 may determine the values of $T_{VB}$ and $T_H$ by looking up the values in transformSet. Tv=transformSet[transformSetIdx][trIdx][1], which evalues to transformSet[9][1][1], which is DST7. $T_H$=transformSet[transformSetIdx][trIdx][0], which evalues to transformSet[9][1][0], which is DST5. Encoder 20 or decoder 30 may determine that the transform pair is {DST-7, DCT-5}.

In an example applying the identity (ID) transform, after the vertical and horizontal transform types have been derived, the vertical and horizontal transform type can be further modified as ID transform. Thus, in certain examples, the ID transform may be substituted for a previously selected vertical and/or horizontal transform within a transform pair in certain circumstances.

Given the block height H, width W, Intra prediction mode intraMode, EMT transform candidate index trIdx, the horizontal and vertical transform type $T_V$ and $T_H$ is further modified as below, HOR_IDX (which may be hard coded as 18) and VER_IDX (which may be hard coded as 48) are the horizontal and vertical intra prediction index, respectively, ID indicates the ID transform type. Transform candidate index trIdx may take a value from 0-3 and is determined based on RD costs. The function abs( ) returns the absolute value.

A threshold look-up table may be defined as:

thrLut[3][3]={{8,6,4},{8,8,6},{4,2,-1}};

Then the horizontal and vertical transform type $T_V$ and $T_H$ may be further modified as follows:

```
if( trIdx==3 && W<=16 && H<=16 )
{
    if( abs(intraMode-HOR_IDX) <= thrLut[log_2(H)-2] [log_2(W)-2] )
    {
        T_V = ID;
    }
    if( abs(intraMode-VER_IDX) <= thrLut[log_2(W)-2] [log_2(H)-2] )
    {
        T_H = ID;
    }
}
```

Thus, where the EMT index is 1, the ID transform may be used. In thrLut, the threshold may defined based on the block size (where larger blocks have a smaller threshold and smaller blocks have a larger threshold). Note that the "if" expression only evaluates to true if the width or height of the block is less than or equal to 16. Thus, the ID transform may be used in the vertical or horizontal direction where the intramode is within a threshold amount away from the vertical and/or horizontal modes. In some examples, the transform pairs defined in transformSet above, are further modified in certain cases to include the ID transform.

For example, in a 4×4 block, with a transform candidate index of 3 and an intramode of 10, encoder 20 or decoder 30 may determine that the expression (trIdx=3 and W≤16 and H≤16) is true. Encoder 20 or decoder 30 may evaluate the expression: abs(intraMode-HOR_IDX)<=thrLut[log 2(H)-2][log 2(W)-2] and would evaluate whether 8≤thrLut[0][0]. Since thrLut[0][0] is 8, the expression may be determined to be true. Therefore, encoder 20 or decoder 30 may determine the vertical transform to be the ID transform (and may swap a different determined vertical transform for the ID transform). Encoder 20 or decoder 30 may evaluate the expression: abs(intraMode-VER_IDX)<=thrLut[log 2(H)-2][log 2(W)-2] and would evaluate whether 38<thrLut[0][0]. Since thrLut[0][0] is 8, the expression may be determined to be false. Therefore, the horizontal transform is not set to the ID transform.

Figure 7:
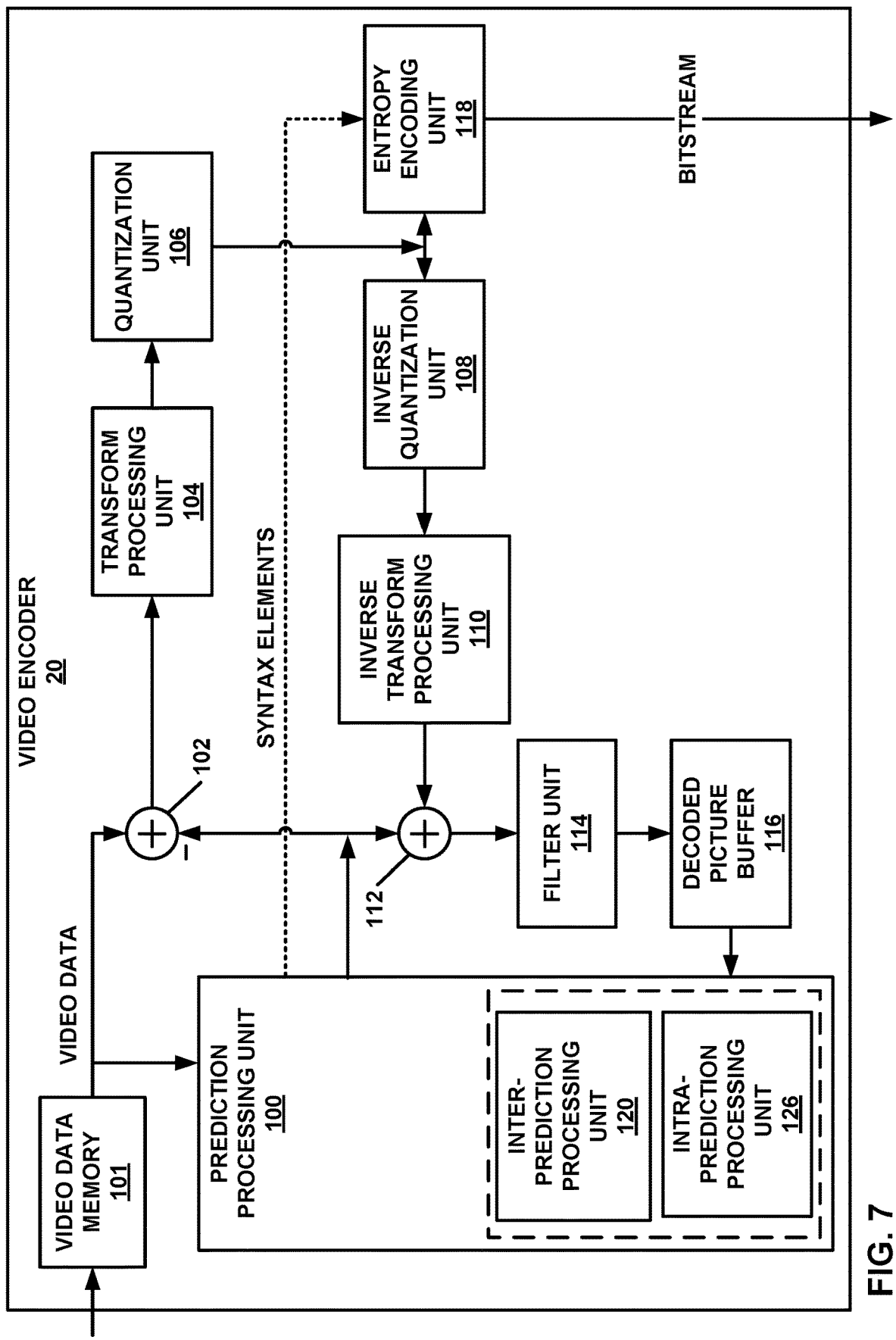
FIG. 7 is a block diagram illustrating an example video encoder that may implement the techniques described in this disclosure.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods. For example, video encoder 20 may be configured to apply more transforms to the transform block than the limited options provided in HEVC.

In the example of FIG. 7, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 35 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

In the examples described in this disclosure, the techniques are applicable to when a video block is intra-predicted or intra-predicted. For example, when a block is intra-predicted, the intra-prediction mode may be used to determine transform subsets. When a block is inter-predicted, its position may be used to determine transform subsets. Accordingly, the example techniques apply to a video block that is intra-predicted in any of the intra-prediction modes or inter-predicted in uni-direction or bi-direction.

Furthermore, the example techniques are not limited to intra-prediction or inter-prediction, and may be extended to intra-block copy (IBC) mode as well. In IBC mode, a predictive block is in the same picture as the video block being encoded, and is identified by a block vector. In IBC mode, transform subsets may be selected from a position of the video block, position of the predictive block, or the block vector as a few examples.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

In the techniques described in this disclosure, transform processing unit 104 may apply a vertical (left) transform and a horizontal (right) transform to a transform block of the TU. In some examples, prediction processing unit 100 may determine which transforms to apply using the techniques described in this disclosure.

For example, prediction processing unit 100 may determine a plurality of transform subsets, each subset identifying one or more candidate transforms, where at least one transform subset identifies a plurality of candidate transforms. The candidate transforms are of different transform types, and in some examples, prediction processing unit 100 determines the plurality of transform subsets based on a size of a video block being encoded. The candidate transforms may be constrained to a set of transforms including {DST-7, DST-4, DCT-8, DCT-5, DST-1} or {DST-7, DST-4, DCT-8, DCT-5, DST-1, ID}. Thus, a relatively small number of transform pairs need to be considered. For example, for angular Intra prediction modes can be selected from {DST-7, DST-7}, {DST-4, DST-4}, {DST-4, DST-7}, {DST-4, DCT-5}, {DST-7, DCT-5}, {DCT-8, DST-7}, {DCT-8, DST-4}, {DCT-5, DST-7}, {DST-1, DST-7}, {DST-1, DST-4}. In some examples, any of the foregoing pairs may be replaced with the ID transform in certain instances. In a transform pair, encoder 20 and decoder 30 may determine which of the pair is selected for the horizontal transform and which is selected for the vertical transform, as described in more detail above.

For example, 10 transform pair sets for N (taking N equals 4 as an example) horizontal/vertical transform pairs may be defined as follows:
{{DST4, DST4}, {DST7, DST7}, {DST4, DCT8}, {DCT8, DST4}}, {{DST4, DST7}, {DST4, DCT5}, {DCT5, DST7}, {DST1, DCT5}}, {{DST7, DST4}, {DST7, DCT5}, {DCT5, DST4}, {DST1, DCT5}}, {{DST7, DST7}, {DST7, DCT5}, {DCT5, DST7}, {DST1, DCT5}}, {{DST7, DST7}, {DST7, DCT8}, {DCT8, DST7}, {DCT5, DCT5}}, {{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST4, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}},
The transform pair sets applied for angular Intra prediction modes can be selected from:
{{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST4, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}}, In certain examples, one or both of the selected transform pair may be swapped with the ID transform when the Intra prediction direction is within a given range of angle relative to the horizontal (or vertical) prediction direction, or the Intra mode index is within a given threshold relative to the mode index of the horizontal (or vertical) prediction direction. The threshold may depend on decoded information, including but not limited to: EMT flag, EMT index, NSST index, RQT depth, block width/height, quantized coefficients, and relative location of TU inside a CU or PU.

Prediction processing unit 100 may select a first transform subset from the plurality of transform subsets for a left transform for a current transform block of a video block of the video data and select a second transform subset from the plurality of transform subsets for a right transform for the transform block of the video block of the video data. The current transform block may be the transform block that transform processing unit 104 generates and on which transform processing unit 104 is to apply the transforms.

Prediction processing unit 100 may determine the left transform and right transform based on the transform pairs within a set of transforms. The set may include, for example, 4 transforms. For instance, prediction processing unit 100 may test each of the transforms in the selected transform subsets and determine which transform provides the best video coding. Prediction processing unit 100 may determine the respective transforms that provide the best video coding as the left transform and the right transform.

Transform processing unit 104 may determine a current coefficient block based on the left transform, right transform, and the current transform block. For instance, transform processing unit 104 may perform the following equation: $Y=C*X*R^T$, where C is the left transform, R is the right transform, X is the current transform block, and Y is the resulting current coefficient block.

If the video block (e.g., CU or PU) is intra-prediction encoded, prediction processing unit 100 may determine the intra-prediction mode of the video block. Prediction processing unit 100 may select the first transform subset based on the determined intra-prediction mode, and select the second transform subset based on the determined intra-prediction mode.

If the video block (e.g., CU or PU) is inter-prediction encoded, prediction processing unit 100 may determine a location of the current transform block in the video block (e.g., determine whether transform block is for the residual generated from a particular location in the video block). Prediction processing unit 100 may select the first transform subset based on the determined location of the current transform block, and select the second transform subset based on the determined location of the current transform block.

For intra-prediction or inter-prediction, in some examples, prediction processing unit 100 may cause entropy encoding unit 118 to signal (e.g., generate in the bitstream) a first transform subset index into the first transform subset to identify a transform in the first transform subset used to determine the current coefficient block, and signal (e.g., generate in the bitstream) a second transform subset index into the second transform subset to identify a transform in the second transform subset used to determine the current coefficient block. In some examples, prediction processing unit 100 may determine a number of nonzero coefficients in the current coefficient block. In these examples, prediction processing unit 100 may cause entropy encoding unit 118 to signal the first transform subset index based on the number of nonzero coefficients being greater than a threshold, and signal the second transform subset index based on the number of nonzero coefficients being greater than the threshold. If the number of nonzero coefficients is less than the threshold, prediction processing unit 100 may not cause entropy encoding unit 118 to signal indices in the first and second transform sub sets.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 (e.g., information indicative of coefficients of the current coefficient block used to reconstruct the video block) and may receive syntax elements from prediction processing unit 100 (e.g., indices into the first and second transform subsets). Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In the example techniques, prediction processing unit 100 determines a predictive block, and generates in the video bitstream, that entropy encoding unit 118 outputs, information indicative of a prediction mode of the video block based on the predictive block. The prediction mode indicates whether the video block is intra-predicted or inter-predicted. For example, the predictive block is a block in the same picture as the video block based on the video block being intra-predicted or in a picture different than the picture that includes the video block based on the video block being inter-predicted. Residual generation unit 102 may determine the current transform block as a residual between the video block and the predictive block.

Figure 8:
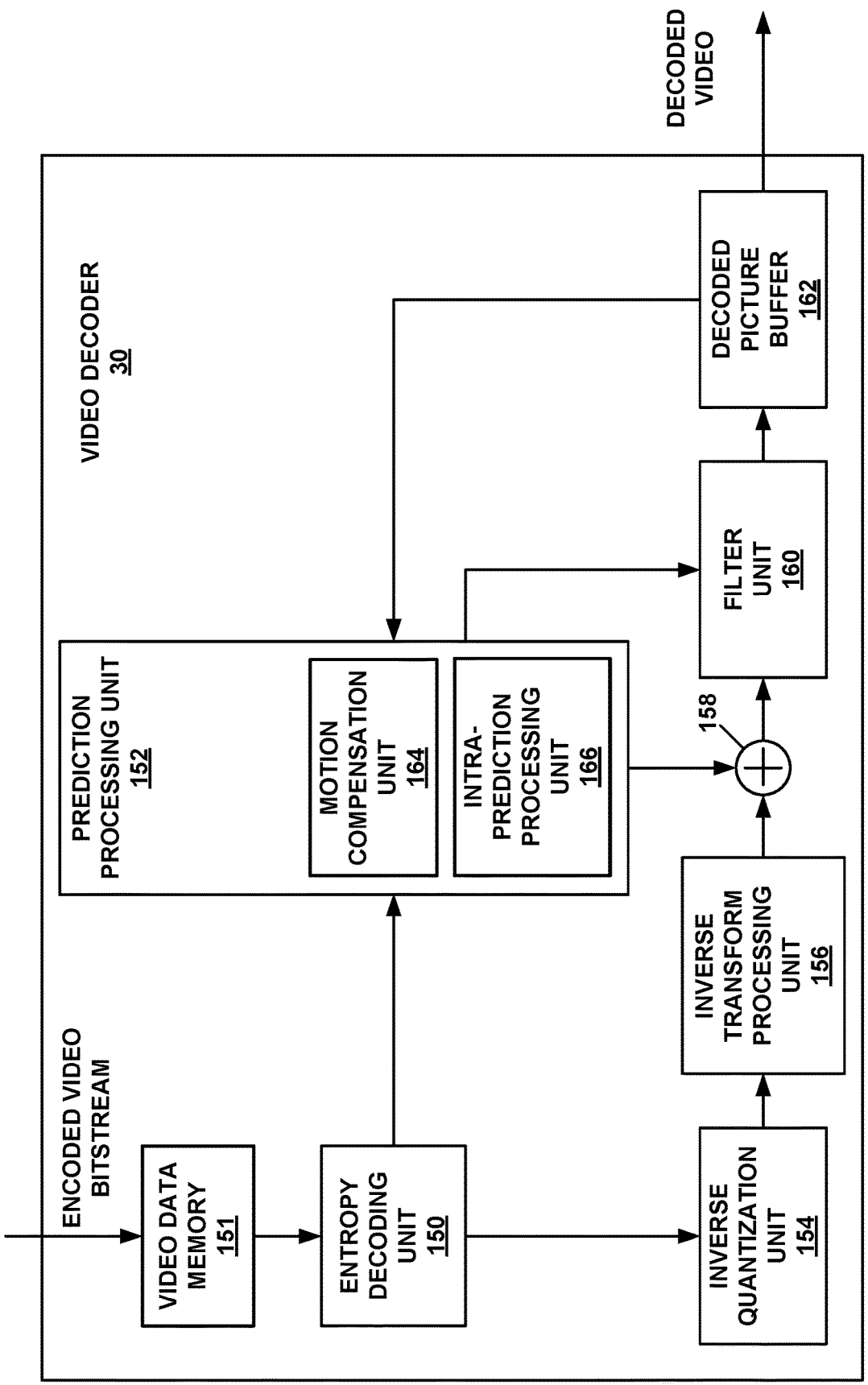
FIG. 8 is a block diagram illustrating an example video decoder that may implement the techniques described in this disclosure.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques in accordance with various examples described in this disclosure. In the example of FIG. 8, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from a computer-readable medium, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

In the techniques described in this disclosure, prediction processing unit 152 may determine the left and right transforms that inverse transform processing unit 156 is to apply. For example, prediction processing unit 152 may determine a plurality of transform subsets, each subset identifying one or more candidate transforms, where at least one transform subset identifies a plurality of candidate transforms. The candidate transforms are of different transform types, and in some examples, prediction processing unit 152 determines the plurality of transform subsets based on all or partial of the decoded information, including but not limited to: EMT flag, EMT index, NSST index, Intra prediction modes, RQT depth, block width/height (e.g., block size), quantized coefficients, and relative location of TU inside a CU or PU.

Prediction processing unit 152 may select a first transform subset from the plurality of transform subsets for a left transform for a current coefficient block of the video data, and select a second transform subset from the plurality of transform subsets for a right transform for the current coefficient block of the video data. Prediction processing unit 152 may determine the left transform from the selected first transform subset, and determine the right transform from the selected second transform subset. The set of transform pairs may be constrained to a set of transforms including {DST-7, DST-4, DCT-8, DCT-5, DST-1} or {DST-7, DST-4, DCT-8, DCT-5, DST-1, ID}. Thus, a relatively small number of transform pairs need to be considered. For example, for angular Intra prediction modes can be selected from {DST-7, DST-7}, {DST-4, DST-4}, {DST-4, DST-7}, {DST-4, DCT-5}, {DST-7, DCT-5}, {DCT-8, DST-7}, {DCT-8, DST-4}, {DCT-5, DST-7}, {DST-1, DST-7}, {DST-1, DST-4}. In some examples, any of the foregoing pairs may be replaced with the ID transform in certain instances.

For example, 10 transform pair sets for N (taking N equals 4 as an example) horizontal/vertical transform pairs may be defined as follows:
{{DST4, DST4}, {DST7, DST7}, {DST4, DCT8}, {DCT8, DST4}}, {{DST4, DST7}, {DST4, DCT5}, {DCT5, DST7}, {DST1, DCT5}}, {{DST7, DST4}, {DST7, DCT5}, {DCT5, DST4}, {DST1, DCT5}}, {{DST7, DST7}, {DST7, DCT5}, {DCT5, DST7}, {DST1, DCT5}}, {{DST7, DST7}, {DST7, DCT8}, {DCT8, DST7}, {DCT5, DCT5}}, {{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST4, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}}, The transform pair sets applied for angular Intra prediction modes can be selected from:
{{DST4, DST4}, {DST4, DCT5}, {DCT8, DST4}, {DST1, DST4}}, {{DST4, DST4}, {DST4, DCT5}, {DCT8, DST4}, {DST1, DST7}}, {{DST4, DST7}, {DST7, DCT5}, {DCT8, DST7}, {DST1, DST7}}, {{DST7, DST7}, {DST7, DCT5}, {DCT8, DST7}, {DST1, DST7}}, {{DST7, DST7}, {DST7, DCT5}, {DCT5, DST7}, {DST1, DST7}}, In certain examples, one or both of the selected transform pair may be swapped with the ID transform when the Intra prediction direction is within a given range of angle relative to the horizontal (or vertical) prediction direction, or the Intra mode index is within a given threshold relative to the mode index of the horizontal (or vertical) prediction direction. The threshold may depend on decoded information, including but not limited to: EMT flag, EMT index, NSST index, RQT depth, block width/height, quantized coefficients, and relative location of TU inside a CU or PU. Prediction processing unit 152 may select from one of the transform pair sets signaled.

Inverse transform processing unit 156 may determine a current transform block based on the left transform, right transform, and the current coefficient block. For instance, inverse transform processing unit 156 may perform the inverse of the following equation: $Y=C*X*R^T$, where Y is the coefficient block, C is the left transform, X is the transform block, and R is the right transform. Again, in this disclosure, it should be understood that inverse transform processing unit 156 applies the inverse of the transform that video encoder 20 applied, but for ease video decoder 30 is described as applying a transform.

Prediction processing unit 152 may reconstruct (e.g., intra-prediction or inter-prediction decode) a video block based on the current transform block and a predictive block. For example, if a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

In the examples described in this disclosure, the techniques are applicable to when a video block is intra-predicted or intra-predicted. For example, when a block is intra-predicted, the intra-prediction mode may be used to determine transform subsets. When a block is inter-predicted, its position may be used to determine transform subsets. Accordingly, the example techniques apply to a video block that is intra-predicted in any of the intra-prediction modes or inter-predicted in uni-direction or bi-direction.

Furthermore, the example techniques are not limited to intra-prediction or inter-prediction, and may be extended to intra-block copy (IBC) mode as well. In IBC mode, a reference block used to form a predictive block is in the same picture as the video block being encoded, and is identified by a block vector. In IBC mode, transform subsets may be selected from position of the video block, position of the reference block, or the block vector as a few examples.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In some examples, where the video block is to be intra-prediction decoded, prediction processing unit 152 may determine an intra-prediction mode of the video block. Prediction processing unit 152 may select the first transform subset based on the determined intra-prediction mode, and select the second transform subset based on the determined intra-prediction mode.

Where the video block is to be inter-prediction decoded, prediction processing unit 152 may determine a location of the current transform block in the video block (e.g., determine whether coefficient block is for the residual generated from a particular location in the video block). Prediction processing unit 152 may select the first transform subset based on the determined location of the current transform block, and select the second transform subset based on the determined location of the current transform block.

In some examples, prediction processing unit 152 may receive a first transform subset index into the first transform subset, and receive a second transform subset index into the second transform subset. In these examples, prediction processing unit 152 may determine the left transform based on a transform in the first transform subset identified by the first transform subset index, and determine the right transform based on a transform in the second transform subset identified by the second transform subset index.

However, prediction processing unit 152 may not need to receive indices in the first and second transform subsets. For instance, prediction processing unit 152 may determine that a number of nonzero coefficients in the current coefficient block is less than a threshold. In such cases, prediction processing unit 152 may determine that a first transform identified in the first transform subset is the left transform without receiving a transform subset index into the first transform subset, in response to determining that the number of nonzero coefficients in the current coefficient block is less than the threshold, and determine that a first transform identified in the second transform subset is the right transform without receiving a transform subset index into the second transform subset, in response to determining that the number of nonzero coefficients in the current coefficient block is less than the threshold.

Also, prediction processing unit 152 may not necessarily determine transforms from transform subsets in all cases. In some examples, prediction processing unit 152 may receive a flag indicating that not all transform blocks of a block that includes the current transform block are transformed using the same transform. In such examples, prediction processing unit 152 may select the first and second transforms, and determine the left and right transforms from the respective first and second transforms in response to receiving the flag indicating that not all transform blocks of the block that includes the current transform block are transformed using the same transform. Examples of the block include a coding tree unit (CTU), a coding unit (CU), or a prediction unit (PU).

In the example techniques, video decoder 30 may receive from a bitstream information indicating a prediction mode (e.g., whether a video block is intra-predicted or inter-predicted), and receive from the bitstream information indicating coefficients of the current coefficient block. Prediction processing unit 152 may determine the predictive block based on the prediction mode, and inverse transform unit 156 or prediction processing unit 152 may construct the coefficient block based on the received information indicating the coefficients. The prediction mode is one of an inter-prediction mode or an intra-prediction mode, and the current transform block is a residual of the video block and the predictive block.

The techniques described above may be performed by video encoder 20 (FIG. 7) and/or video decoder 30 (FIG. 8), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

Figure 9:
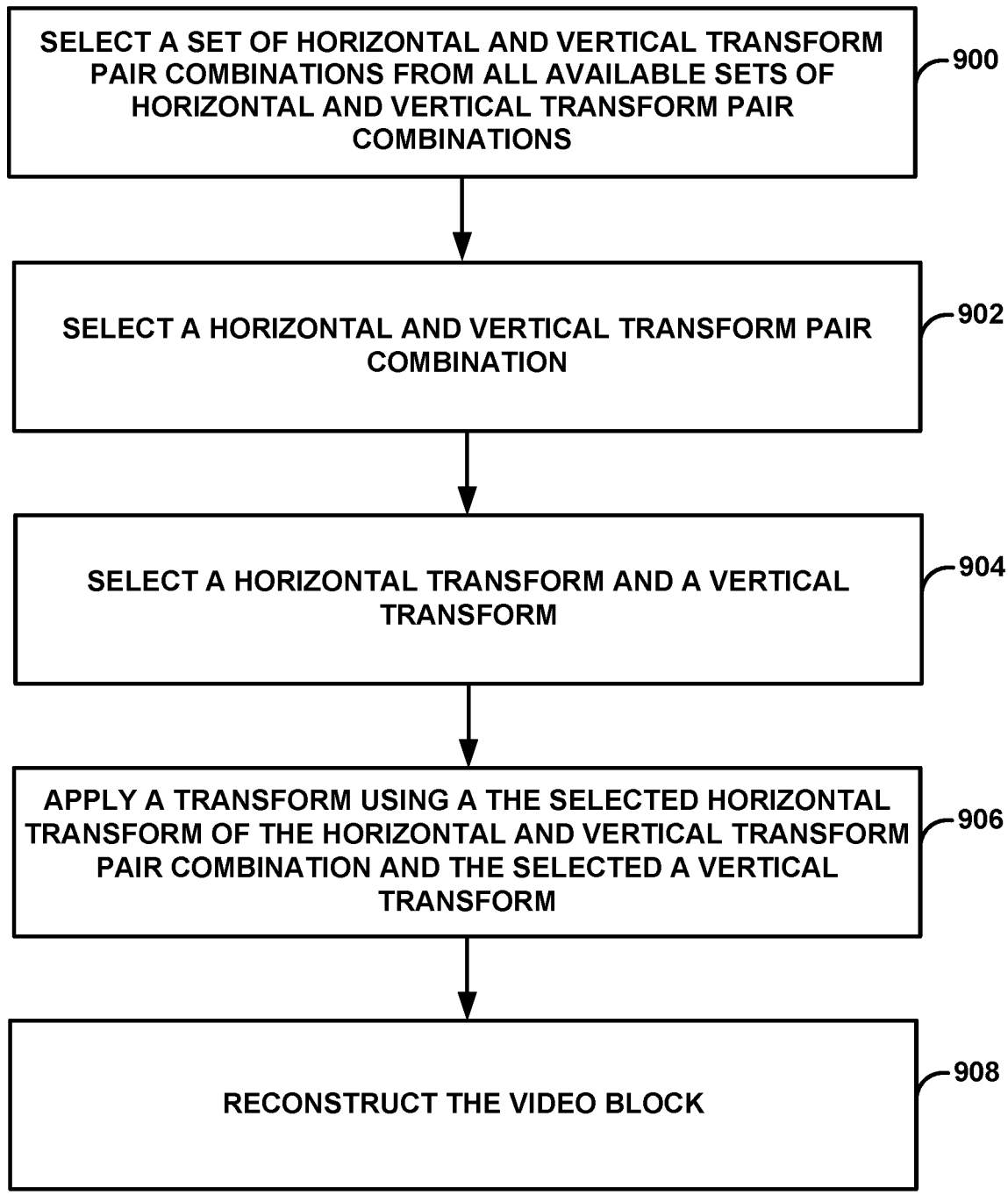
FIG. 9 is a flowchart illustrating an example method of coding video data.

FIG. 9 is a flowchart illustrating an example method of coding video data. Video decoder 30 and/or video encoder 20 may for a current coefficient block of a video block encoded according to one of a plurality of prediction modes, determine a horizontal and vertical transform pair combination from a subset of all available horizontal and vertical transform pair combinations for a selected set of transforms (900). The selection may be for a current coefficient block of a video block encoded according to one of a plurality of prediction modes. The set of horizontal and vertical transform pair combination includes one or more horizontal and vertical transform pair combinations. In some examples, the set of horizontal and vertical transform pair combinations includes four horizontal and vertical transform pairs. In other examples, however, a greater or fewer number of transform pairs are in the set. In some examples, video decoder 30 and/or video encoder 20 may substitute a transform of the horizontal and vertical transform pair combination with an identity (ID) transform.

Video decoder 30 and/or video encoder 20 may select a horizontal and vertical transform pair combination from the selected set of horizontal and vertical transform pair combinations (902). In the example where there are four transform pairs in the set, video decoder 30 and/or video encoder 20 selects a single transform pair.

Video decoder 30 and/or video encoder 20 may select a horizontal transform and a vertical transform from the selected horizontal and vertical transform pair combination (904). In some examples, video decoder 30 and/or video encoder 20 select which of the transform pair is the horizontal transform and which is the vertical transform.

Video decoder 30 and/or video encoder 20 may apply a transform using the selected horizontal transform and the selected vertical transform to the current coefficient block to determine a current transform block (906). Video decoder 30 may apply an inverse transform. Video encoder 20 may apply a forward transform. The transform matrix applied in the inverse transform may be a transposed transform matrix applied in the forward transform. Video decoder 30 and/or video encoder 20 may reconstruct the video block based on the current transform block and a predictive block (908).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising: storing a plurality of look-up tables, wherein each look-up table of the plurality of look-up tables includes a set of horizontal and vertical transform pair combinations wherein each set of horizontal and vertical transform pair combinations for the plurality of look-up tables includes a plurality but fewer than all possible sets of horizontal and vertical transform pair combinations, wherein each horizontal and vertical transform pair combination of each set of horizontal and vertical transform pair combinations includes both a horizontal transform and a vertical transform and is associated with a respective transform pair set index;
  for a current coefficient block of a video block encoded according to one of a plurality of prediction modes, selecting a look-up table from the plurality of look-up tables based on one or both of a height of the current coefficient block or a width of the current coefficient block;
  determining a transform pair set index;
  selecting a horizontal and vertical transform pair combination associated with the determined transform pair set index from a set of horizontal and vertical transform pair combinations for the selected look-up table;
  applying an inverse transform using the horizontal transform of the horizontal and vertical transform pair combination and the vertical transform of the horizontal and vertical transform pair combination to the current coefficient block to determine a current transform block; and
  reconstructing the video block based on the current transform block and a predictive block.

2. The method of claim 1, wherein all possible transforms comprises N transforms, wherein all the possible horizontal and vertical transform pair combinations comprises $N^2$ horizontal and vertical transform pair combinations, and wherein the selected look-up table stores fewer than $N^2$ horizontal and vertical transform pair combinations.

3. The method of claim 1, wherein the set of horizontal and vertical transform pair combinations for the selected look-up table consist of: {DST-7, DST-7}, {DST-4, DST-4}, {DST-4, DST-7}, {DST-7, DST-4}, {DCT-8, DST-7}, {DCT-8, DST-4}, {DST-7, DCT-5}, {DCT-5, DST-7}, {DST-7, DCT-8}, {DST-4, DCT-5}, {DST-1, DST-7}, {DST-1, DST-4}, {DST-1, DCT-5}, and {DCT-5, DCT-5} horizontal and vertical transform pair combinations,
  wherein DST refers to a type of discrete sine transform, and DCT refers to a type of discrete cosine transform.

4. The method of claim 1, wherein the set of horizontal and vertical transform pair combinations for the selected look-up table consist of: {DST-7, DST-7}, {DST-4, DST-4}, {DST-4, DST-7}, {DST-7, DST-4}, {DCT-8, DST-7}, {DCT-8, DST-4}, {DST-7, DCT-5}, {DCT-5, DST-7}, {DST-7, DCT-8}, {DST-4, DCT-5}, {DST-1, DST-7}, {DST-1, DST-4}, {DST-1, DCT-5}, {DCT-5, DCT-5}, {DST-7, ID}, {DST-4, ID}, {DCT-8, ID}, (DCT-5, ID}, {DST-1, ID} and {ID, ID} horizontal and vertical transform pair combinations,
  wherein DST refers to a type of discrete sine transform, DCT refers to a type of discrete cosine transform, and ID refers to an identity transform.

5. The method of claim 1, wherein selecting the horizontal and vertical transform pair combination associated with the determined transform pair set index from the set of horizontal and vertical transform pair combinations for the selected look-up table comprises:
  determining an Enhanced Multiple Transform (EMT) index value; and
  selecting the horizontal and vertical transform pair combination from the set of horizontal and vertical transform pair combinations based on the determined EMT index value.

6. The method of claim 1, wherein the set of horizontal and vertical transform pair combinations includes an identity (ID) transform for a horizontal or vertical transform.

7. The method of claim 1, wherein selecting the horizontal and vertical transform pair combination associated with the determined transform pair set index from the set of horizontal and vertical transform pair combinations for the selected look-up table comprises selecting an identity (ID) transform for a horizontal or vertical transform based on the one of the plurality of prediction modes comprising an intra prediction mode within a threshold associated with a horizontal or vertical intra prediction mode.

8. The method of claim 7, wherein the threshold is based on a size of the current coefficient block.

9. The method of claim 7, wherein the threshold is based on a distance between an angle associated with the intra prediction mode and the horizontal or vertical intra prediction mode.

10. The method of claim 1, wherein the set of horizontal and vertical transform pair combinations for the selected look-up table comprises four horizontal and vertical transform pairs.

11. A device for decoding video data, the device comprising:
  a memory configured to store the video data; and
  one or more processors configured to:
    store a plurality of look-up tables, wherein each look-up table of the plurality of look-up tables includes a set of horizontal and vertical transform pair combinations, wherein each set of horizontal and vertical transform pair combinations for the plurality of look-up tables includes a plurality but fewer than all possible sets of horizontal and vertical transform pair combinations, wherein each horizontal and vertical transform pair combination of each set of horizontal and vertical transform pair combinations includes both a horizontal transform and a vertical transform and is associated with a respective transform pair set index;
    for a current coefficient block of a video block encoded according to one of a plurality of prediction modes, select a look-up table from the plurality of look-up tables based on one or both of a height of the current coefficient block or a width of the current coefficient block;
    determine a transform pair set index;
    select a horizontal and vertical transform pair combination associated with the determined transform pair set index from a set of horizontal and vertical transform pair combinations for the selected look-up table;
    apply an inverse transform using the horizontal transform of the horizontal and vertical transform pair combination and the vertical transform of the horizontal and vertical transform pair combination to the current coefficient block to determine a current transform block; and
    reconstruct the video block based on the current transform block and a predictive block.

12. The device of claim 11, wherein all possible transforms comprises N transforms, wherein all the possible horizontal and vertical transform pair combinations comprises $N^2$ horizontal and vertical transform pair combinations, and wherein the selected look-up table stores fewer than $N^2$ horizontal and vertical transform pair combinations.

13. The device of claim 11, wherein the set of horizontal and vertical transform pair combinations stored by for the selected look-up table consist of: {DST-7, DST-7}, {DST-4, DST-4}, {DST-4, DST-7}, {DST-7, DST-4}, {DCT-8, DST-7}, {DCT-8, DST-4}, {DST-7, DCT-5}, {DCT-5, DST-7}, {DST-7, DCT-8}, {DST-4, DCT-5}, {DST-1, DST-7}, {DST-1, DST-4}, {DST-1, DCT-5}, and {DCT-5, DCT-5} horizontal and vertical transform pair combinations, wherein DST refers to a type of discrete sine transform, and DCT refers to a type of discrete cosine transform.

14. The device of claim 11, wherein the set of horizontal and vertical transform pair combinations for the selected look-up table consist of: {DST-7, DST-7}, {DST-4, DST-4}, {DST-4, DST-7}, {DST-7, DST-4}, {DCT-8, DST-7}, {DCT-8, DST-4}, {DST-7, DCT-5}, {DCT-5, DST-7}, {DST-7, DCT-8}, {DST-4, DCT-5}, {DST-1, DST-7}, {DST-1, DST-4}, {DST-1, DCT-5}, {DCT-5, DCT-5}, {DST-7, ID}, {DST-4, ID}, {DCT-8, ID}, (DCT-5, ID}, {DST-1, ID} and {ID, ID} horizontal and vertical transform pair combinations, wherein DST refers to a type of discrete sine transform, DCT refers to a type of discrete cosine transform, and ID refers to an identity transform.

15. The device of claim 11, wherein to select the horizontal and vertical transform pair combination associated with the determined transform pair set index from the set of horizontal and vertical transform pair combinations for the selected look-up table, the one or more processors configured to:

determine an Enhanced Multiple Transform (EMT) index value; and select the horizontal and vertical transform pair combination from the set of horizontal and vertical transform pair combinations based on the determined EMT index value.

16. The device of claim 11, wherein the set of horizontal and vertical transform pair includes an identity (ID) transform for a horizontal or vertical transform.

17. The device of claim 11, wherein to select the horizontal and vertical transform pair combination associated with the determined transform pair set index from the set of horizontal and vertical transform pair combinations for the selected look-up table, the one or more processors are configured to select an identity (ID) transform for a horizontal or vertical transform based on the one of the plurality of prediction modes comprising an intra prediction mode within a threshold associated with a horizontal or vertical intra prediction mode.

18. The device of claim 17, wherein the threshold is based on a size of the current coefficient block.

19. The device of claim 17, wherein the threshold is based on a distance between an angle associated with the intra prediction mode and the horizontal or vertical intra prediction mode.

20. A device for decoding video data, comprising:

means for storing a plurality of look-up tables, wherein each look-up table of the plurality of look-up tables includes a set of horizontal and vertical transform pair combinations, wherein each set of horizontal and vertical transform pair combinations for the plurality of look-up tables includes a plurality but fewer than all possible sets of horizontal and vertical transform pair combinations, wherein each horizontal and vertical transform pair combination of each set of horizontal and vertical transform pair combinations includes both a horizontal transform and a vertical transform and is associated with a respective transform pair set index;

means for selecting a look-up table from the plurality of look-up tables for a current coefficient block of a video block encoded according to one of a plurality of prediction modes based on one or both of a height of the current coefficient block or a width of the current coefficient block;

means for determining a transform pair set index;

means for selecting a horizontal and vertical transform pair combination associated with the determined transform pair set index from a set of horizontal and vertical transform pair combinations for the selected look-up table;

means for applying an inverse transform using the horizontal transform of the horizontal and vertical transform pair combination and the vertical transform of the horizontal and vertical transform pair combination to the current coefficient block to determine a current transform block; and means for reconstructing the video block based on the current transform block and a predictive block.

21. A non-transitory computer readable medium that stores instructions that, when executed by one or more processors cause the one or more processors to:

store a plurality of look-up tables, wherein each look-up table of the plurality of look-up tables includes a set of horizontal and vertical transform pair combinations, wherein each set of horizontal and vertical transform pair combinations for the plurality of look-up tables includes a plurality but fewer than all possible sets of horizontal and vertical transform pair combinations, wherein each horizontal and vertical transform pair combination of each set of horizontal and vertical transform pair combinations includes both a horizontal transform and a vertical transform and is associated with a respective transform pair set index;

for a current coefficient block of a video block encoded according to one of a plurality of prediction modes, select a look-up table from the plurality of look-up tables based on one or both of a height of the current coefficient block or a width of the current coefficient block;

determine a transform pair set index;

select a horizontal and vertical transform pair combination associated with the determined transform pair set index from a set of horizontal and vertical transform pair combinations for the selected look-up table;

apply an inverse transform using the horizontal transform of the horizontal and vertical transform pair combination and the vertical transform of the horizontal and vertical transform pair combination to the current coefficient block to determine a current transform block; and reconstruct the video block based on the current transform block and a predictive block.

* * * * *